(12) United States Patent
Paleologu et al.

(10) Patent No.: US 9,003,103 B2
(45) Date of Patent: Apr. 7, 2015

(54) NONVOLATILE MEDIA DIRTY REGION TRACKING

(75) Inventors: Emanuel Paleologu, Kirkland, WA (US); Karan Mehra, Sammamish, WA (US); Darren Moss, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 13/229,871

(22) Filed: Sep. 12, 2011

(65) Prior Publication Data

US 2013/0067179 A1    Mar. 14, 2013

(51) Int. Cl.
*G06F 13/00* (2006.01)
*G06F 11/10* (2006.01)
*G06F 11/20* (2006.01)

(52) U.S. Cl.
CPC ........ *G06F 11/1076* (2013.01); *G06F 11/2064* (2013.01); *G06F 2211/1009* (2013.01); *G06F 2211/1035* (2013.01); *G06F 2211/1061* (2013.01); *G06F 2211/104* (2013.01)

(58) Field of Classification Search
USPC .......................................... 711/159, 170, 103
See application file for complete search history.

(56) References Cited

U.S. PATENT DOCUMENTS

| 7,055,058 | B2 | 5/2006 | Lee et al. |
| 7,103,796 | B1 | 9/2006 | Kekre et al. |
| 7,395,378 | B1 | 7/2008 | Pendharkar et al. |
| 7,415,488 | B1 | 8/2008 | Muth et al. |
| 7,904,678 | B1 | 3/2011 | Karr et al. |
| 2010/0274980 | A1 | 10/2010 | Stringham |

FOREIGN PATENT DOCUMENTS

| CN | 1991775 A | 7/2007 |
| CN | 102929750 | 2/2013 |

OTHER PUBLICATIONS

Denehy, et al., "Journal-Guided Resynchronization for Software RAID", Retrieved at <<http://www.usenix.org/events/fast05/tech/full_papers/denehy/denehy.pdf>>, Proceedings of the 4th USENIX Conference on File and Storage Technologies, vol. 4, 2005, pp. 87-100.

(Continued)

*Primary Examiner* — Matthew Bradley
(74) *Attorney, Agent, or Firm* — John Jardine; Kate Drakos; Micky Minhas

(57) ABSTRACT

A storage set (e.g., an array of hard disk drives) may experience a failure, such as a loss of power, a software crash, or a disconnection of a storage device, while writes to the storage set are in progress. Recover from the failure may involve scanning the storage set to detect and correct inconsistencies (e.g., comparing mirrors of a data set or testing checksums). However, lacking information about the locations of pending writes to the storage set during the failure, this "cleaning" process may involve scanning the entire storage set, resulting in protracted recovery processes. Presented herein are techniques for tracking writes to the storage set by apportioning the storage set into regions of a region size (e.g., one gigabyte), and storing on the nonvolatile storage medium descriptors of "dirty" regions comprising in-progress writes. The post-failure recovery process may then be limited to the regions identified as dirty.

20 Claims, 11 Drawing Sheets

(56) References Cited

OTHER PUBLICATIONS

Appuswamy, et al., "Loris—A Redundant Array of Independent Physical Layers", Retrieved at <<http://www.asci.tudelft.nl/media/proceedings_asci_conference_2010/asci2010_submission_18.pdf>>, ASCI conference 2010, pp. 1-8.

"Write Intent Bitmaps with Linux Software RAID", Retrieved at <<http://blog.liw.fi/posts/write-intent-bitmaps/>>, Retrieved Date: Mar. 9, 2011, p. 1.

"RAID 1 Volume Read and Write Policies", Retrieved at <<http://www.shrubbery.net/solaris9ab/SUNWaadm/LOGVOLMGRADMIN/p19.html>>, Retrieved Date: Mar. 9, 2011, pp. 4.

"Veritas Volume Manager", Retrieved at <<http://www.maje.biz/doc-technique/text/45a47162-375.html>>, Retrieved Date: Mar. 9, 2011, pp. 7.

"The Dirty Region Logging feature of VERITAS Volume Manager (tm) for Windows 2000 and VERITAS Storage Foundation (tm) for Windows", Retrieved at <<http://www.symantec.com/business/support/index?page=content&id=TECH17630&key=15274&actp=LIST>>, Jan. 1, 2003, pp. 5.

"International Search Report", Mailed Date: Sep. 25, 2012, Application No. PCT/US2011/055590, Filed Date: Oct. 10, 2011, pp. 10.

Russian Office Action (Translation) cited in Russian Application No. 2014109361 dated Jun. 4, 2014, 3 pgs.

Reply Russian Office Action cited in Russian Application No. 2014109361 dated Jun. 4, 2014, 3 pgs.

Int. Preliminary Report cited in PCT Application No. PCT/US2011/055590 dated Mar. 12, 2014, 6 pgs.

First Chinese Office Action cited in Chinese Application No. 201210335689.4 dated Apr. 1, 2014, 14 pgs.

"Second Office Action Issued In Chinese Patent Application No. 201210335689.4", Mailed Date: Dec. 1, 2014, 12 Pages.

"Translation of claims for response to Second Office Action Issued In Chinese Patent Application No. 201210335689.4" Dated Jan. 16, 2015, 3 pages.

NONVOLATILE MEDIA DIRTY REGION TRACKING

BACKGROUND

Within the field of computing, many scenarios involve a storage set provided by a set of storage devices (e.g., an array of hard disk drives interoperating according to a Redundant Array of Inexpensive Disks (RAID) array), and that may be accessed by various devices and processes to store and retrieve various types of data. In many such scenarios, data stored in different portions of the storage set may have a relationship. As a first example, a first data set and a second data set stored in the storage set may reference each other, such as related records in a database system. As a second example, two or more identical versions of the data may be retained in order to provide various advantages. For example, two storage devices may store and provide access to the same data set, thereby effectively doubling the access rate to the data. Identical copies of the data may be also retained in order to protect the integrity of the data; e.g., if a first copy of the data is lost due to a failure, such as data corruption or a hardware fault (e.g., a hard drive crash), an identical second copy of the data set may be accessed and replicated to recover from the failure.

As a third such example, data may be associated in order to detect and/or safeguard against errors or unintended changes to the data. For example, an error in the reading or storing logic of the device, a buffer underrun or overrun, a flaw in the storage medium, or an external disruption (such as a cosmic ray) may occasionally cause an inadvertent change in the data stored on the storage medium or in the reading of data from the storage medium. Therefore, in many such scenarios, for respective portions of data stored on the storage devices, a verifier, such as a checksum, may be calculated and stored, and may be used to confirm that the contents of the data set have been validly stored to and/or read from the storage device. As one such example, in the context of storing a data set comprising a set of bits, an exclusive OR (XOR) operation may be applied to the bits, resulting in a one-bit checksum that may be stored and associated with this data set. When the data set is later read, another XOR operation may be applied thereto, and the result may be compared with the one-bit checksum. A change of any one bit results in a mismatch of these XOR computations, indicating that the data has been incorrectly stored, altered, or incorrectly read from the storage device. Many types of verifiers may be identified, which may vary in some features (e.g., ease of computation, a capability of identifying which bit of the data set has changed, and an error-correction capability whereby an incorrectly read portion of data may be corrected).

Various forms of data replication are often achieved through the use of a Redundant Array of Inexpensive Disks (RAID) arrays, such as a set of hard disk drives that are pooled together to achieve various aggregate properties, such as improved throughput and automatic data mirroring. As a first such example, in a RAID 1 array, a set of two or more hard disk drives of the same size store identical copies of the storage set, and any update to the storage set is identically propagated across all of the hard disk drives. The storage set therefore remains accessible in the event of hard disk drive failures, even multiple such failures, as long as even one hard disk drive remains functional and accessible. As a second such example, a RAID 4 array involves a set of two or more disks, where one disk is included in the array not to store user data, but to store verifiers of the data stored on the other disks. For example, for a RAID 4 array involving four disks each storing one terabyte of data, the capacity of the first three disks is pooled to form a three-terabyte storage space for user data, while the fourth disk is included in the array to hold verifiers for data sets stored on the first three disks (e.g., for every three 64-bit words respectively stored on the other three disks, the fourth disk includes a 64-bit verifier that verifies the integrity of the three 64-bit words). The RAID array controller comprises circuitry that is configured to implement the details of a selected RAID level for a provided set of hard disk drives (e.g., upon receiving a data set, automatically apportioning the data across the three user data disks, calculating the verifier of the data set, and storing the verifier on the fourth disk). The RAID techniques used may also enable additional protections or features; e.g., if any single storage device in a RAID 4 array fails, the data stored on the failed device may be entirely reconstructed through the use of the remaining storage devices.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While writing associated sets of data on a storage system, problems may arise during the writing that cause an inconsistency among the associated data sets. As a first example, in a mirrored data set, an error may occur while writing to one of the mirrors, such as an inadvertent change of the data due to a cosmic ray, a flaw in the physical medium, or a logical error in the read/write process. As a result, the mirrors of the data set may not match, and it may be difficult to choose a correct version of the data. As a second example, problems may arise due to the delay between storing a data set and its verifier (or vice versa). For example, many storage devices only support a write to one location at a time (e.g., the location underneath the write head of a hard disk drive, or the location specified by an address register in a solid-state storage device), and the sequential storing of data involves writing the data set before the verifier, or vice versa. As another example, if the data set and verifier are stored on different storage devices, it may be difficult to synchronize the moment that the first storage device stores the data set with the moment that the second storage device stores the verifier of the data set. As a result, storing a data set and a corresponding verifier occur not a synchronous manner, but in a sequential manner. Many sources of failure may interrupt the storage process, such as power loss, a hardware failure, a software crash, or an unanticipated removal of a storage device from the array. If such failures arise in the moment after storing a data set and before storing the verifier, then a verifier error may later arise during a read that jeopardizes the confidence in the accuracy of the data. In addition to the data being actively written by the storage device(s), a failure may also disrupt other writes that have not completed, such as data stored in a write buffer and scheduled for imminent writing.

In these and other scenarios, the consistency of the data set may be detected through a verification process, e.g., by comparing identical data sets or comparing verifiers with the corresponding data. Accordingly, upon detecting a catastrophic failure, the data on one or more storage devices may be "cleaned" by verifying the data and possibly correcting inconsistencies. However, while the occurrence of a failure may be easily detected (e.g., an incorrect shutdown or a replacement of a failed storage device), it may not be possible to determine which portions of the storage set were being written at the time of the writing and may have been compromised by the failure. Without such information, the entire storage set may have to be cleaned by verifying every data set in the storage set (e.g., comparing the entirety of each copy of a mirrored data set to detect inconsistencies, and testing the verifiers of every data set in the storage set). Cleaning the entire storage set may take a long time, particularly in view of the growth of storage set capacities into the range of petabytes, resulting in a protracted recovery period following even a brief period of catastrophic failure; and although this extensive cleaning process may ensure the integrity of the storage set, the extent of the cleaning process of the entire volume (often involving data sets and even storage devices that have not been written in a long time) may be disproportionate to the comparatively small number of writes that may have been in process at the time of the failure.

Presented herein are techniques for focusing the cleaning of a storage set on data that may have been compromised by a failure. In accordance with these techniques, before writing to a location in the storage set, a storage device may store on the same nonvolatile physical medium a descriptor indicating the location where the write is to occur, and may after erase the descriptor after the write has completed. In this manner, the storage devices may track the "dirty" areas of the storage set, and upon recovering from a failure, may initiate a cleaning of only the "dirty" areas of the storage set. However, it may be appreciated that recording (and flushing) the address on the nonvolatile physical medium of every write, and erasing (and flushing) the address after confirming the completion of the write to the physical medium, may significantly increase (e.g., tripling) the number of seeks and writes involved in writing each data set, thereby reducing the performance (e.g., latency and throughput) of the storage set. At the other extreme, tracking "dirty" information only at a high level, such as per storage device, partition, or volume, may insufficiently focus the cleaning process. For example, if "dirty" information is tracked per volume, the cleaning process may focus on a particular volume that was in use at the time of the writing, but the volume may comprise multiple terabytes of data that result in an extensive cleaning process, even if only a few megabytes of data were being written. Consequently, according to the techniques presented herein, the storage set may be apportioned into regions of a region size, and "dirty" information may be tracked for each region. For example, apportioning the storage set into regions of one gigabyte may enable a comparatively precise tracking of regions, while also reducing the frequency of updating the dirty region information (e.g., when a write is initiated in a region, it is marked as "dirty," and may remain so marked through extensive sequential writes within the region). The selection of the region size may therefore be viewed as a tradeoff between precision in the of dirty region information, leading to more focused and shorter cleaning processes, and reduction in the performance costs of implementing the dirty region tracking process.

Additional techniques may further reduce the frequency of updates to the dirty region information. As a first example, before writing a dirty region descriptor for a region to which a write has been requested, an embodiment may determine whether the region is already marked as dirty on the storage medium, and may avoid redundantly marking the region as dirty. As a second example, a region to which a write has recently completed may present a high probability of an imminent subsequent write to the same region. Therefore, rather than promptly marking the region as clean following completion of the write, the "clean" remaking may be deferred for a brief duration; and if a subsequent write to the same region is received, the region may remain marked as dirty, rather than having to mark the region as dirty shortly after having marked the region as clean. In one such embodiment, a volatile memory representation of the dirty region descriptors may be generated and used to determine when to mark such regions as dirty or clean. For example, the in-memory representation may record the times of the last write request to each region, and may mark as clean any regions that have not been written to for a defined duration. Additionally, the in-memory representation may enable a batch recording of "clean" regions, further reducing the amount of storage media writes involved in the dirty region tracking process. These and other uses of the in-memory tracking of a "working set" of dirty regions may reduce the number of accesses to the storage devices, and hence the performance costs of the nonvolatile dirty region tracking, without significantly reducing the precision of the cleaning process. These and other techniques may further reduce the performance costs of implementing the dirty region tracking without significantly prolonging the cleaning process during a recovery from a failure of the storage set.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
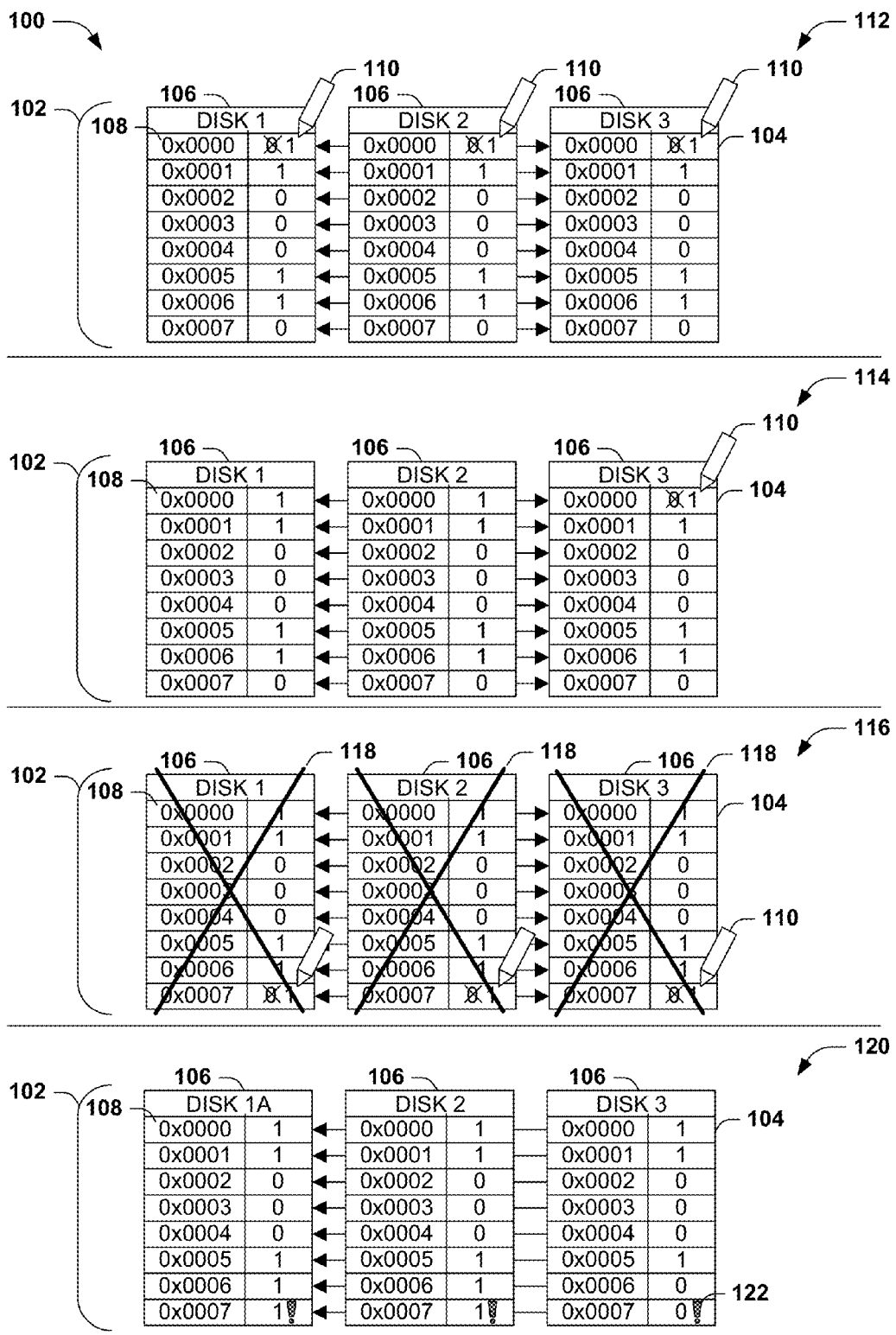
FIG. 1 is an illustration of an exemplary scenario featuring a failure of the storage set that may compromise a mirrored data set stored on several storage devices.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve the storage of data comprising a storage set on one or more nonvolatile storage devices (e.g., platter-based magnetic and/or optical hard disk drives, solid-state storage devices, and nonvolatile memory circuits). Many details of the data storage may vary, such as the word size, the addressing method, the partitioning of the storage space of the storage device into one or more partitions, and the exposure of allocated spaces within the storage device as one or more volumes within a computing environment. Additionally, the storage devices may operate independently or with loose cooperation to provide the storage set. For examine, in an array structured according to a RAID 0 scheme, a storage set may simply be aggregated from the capacity provided by each storage device, each of which may operate independently of the other disks. Alternatively, the storage devices may be configured to provide various features through varying degrees of tight coordination. For example, in an array structured as according to a RAID 1 scheme, a set of storage devices may each store an identical copy of the entire storage set; e.g., a one-terabyte storage set may be stored as four identical copies on four one-terabyte storage devices, which may interoperate to ensure that any request to alter the storage set is equivalently applied to all four storage devices in order to maintain synchrony. A "mirrored" archive of this nature may present improved access rates; e.g., different processes may access the storage set through different storage devices, potentially quadrupling the access rate to the storage set that may be achievable by any single device. Additionally, this type of array demonstrates robust durability; if one or more hard disk drives fails (e.g., due to data corruption, damage, or loss), the storage set is still accessible through the other hard disk drives, and remains intact as long as at least one hard disk drive remains valid and accessible. However, the advantages of these features are offset in a RAID 1 array by the considerable loss of capacity (e.g., the use of four terabytes of hard disk drive space to store one terabyte of data). Other storage schemes may provide some of these security and performance features with less reduction of the capacity (e.g., in a RAID 4 scheme, a set of (n) drives of space (s) exposes the full storage capacity of all but one hard disk drive that is reserved to store parity information, and can recover from the failure of any one hard disk drive in the array).

In these and other scenarios, data sets may be stored to the storage set by various devices and processes. However, many forms of failure may occur during the use of the storage set that may compromise the storage of data. For example, while writes to the storage set on behalf of various processes are accessing the data set, a software failure may occur in the writing process, in a storage set management process, in a device driver for the software, or in the operating system; the computer may lose communication with the storage device (e.g., the storage device may be disconnected, or a wired or wireless network connecting the computer and the storage device may fail); or the storage device may experience a hardware failure (e.g., a head crash in a hard disk drive or an interruption of power). These and other forms of failure may occur suddenly and without warning, and may interrupt the process of writing data to the storage set.

In the event of a failure of the storage set during one or more writes, some types of failure may be recoverable, or may be result in an insignificant loss of data. For example, the failure may occur shortly after the data was written to the storage set and is recoverable; may cause the loss of data that may be regenerated or that is not valuable; or may cause the loss of a small amount of data in a comparatively large data set, such as the loss of a few email messages in a very large email message archive. However, other types of failure may present significant problems. In particular, some associations may exist among two or more sets of data that are written to the storage set, and a failure that occurs while writing a first data set may result in an inconsistency in the associated data set. Such an inconsistency may not only compromise the integrity of the data set being written at the moment of failure, but also the associated data sets. Indeed, in some scenarios, a complete failure of the write and a loss of the data to be written may cause fewer problems than an incomplete write to the storage set. As a first example, if a failure occurs during an updating of a first copy of a mirrored data set, the detected inconsistency between this copy and another copy may call into question the integrity of both copies. Moreover, if both copies were being updated at the moment of failure, and an inconsistency is subsequently detected, it may be difficult to determine which copy successfully completed the write before the failure and which copy failed to do so. As a second example, if an inconsistency is detected between a data set and its checksum, it may be difficult to determine whether data set or the checksum is in error. Moreover, if a checksum is calculated from several data sets, a failure to complete a write to one data set may result in an incorrect checksum and a reduction of trust not only in the integrity of the data set and the checksum, but in all of the other data sets represented by the checksum. In these and other scenarios, the failure to complete a write to a data set may result in inconsistencies that compromise the reliability of a broad range of data in the storage set, even including other data sets that are only tangentially related to the incompletely written data set.

Figure 2:
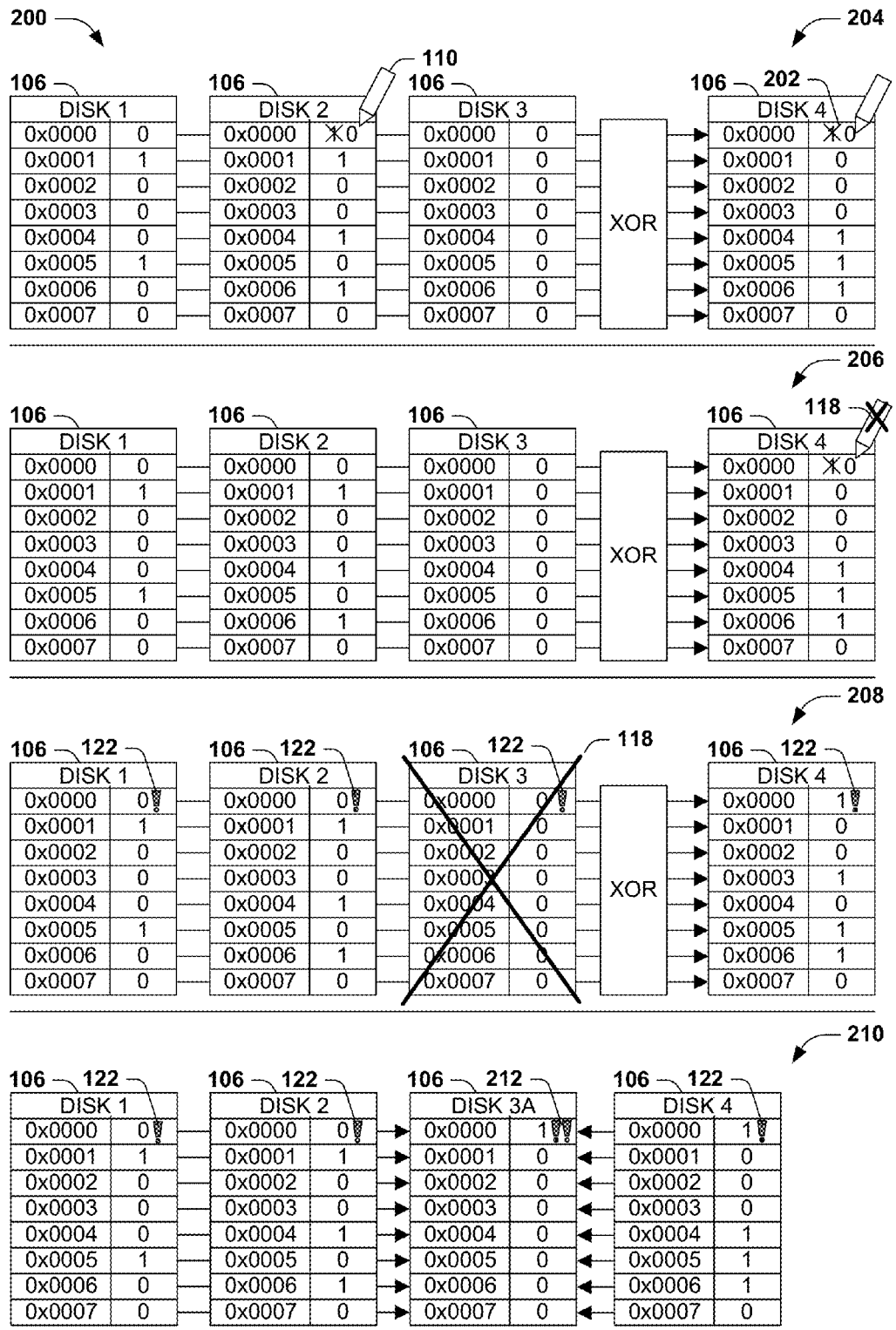
FIG. 2 is an illustration of an exemplary scenario featuring a failure of the storage set that may compromise the consistency of a data set and a verifier (e.g., a checksum) of the data set.

FIGS. 1 and 2 present two different scenarios illustrating the consequences of a failure while writing to a storage set. In the exemplary scenario 100 of FIG. 1, a storage set 102, comprising various data sets 104 (e.g., bits, bytes, words, sectors, files, or records) is stored on a set of storage devices 106, where a mirroring relationship exists among the data sets 104. In particular, the storage devices 106 in this exemplary scenario 100 are configured to store identical copies of the data set 104, such as in a RAID 1 scheme. (The mirroring may be performed in a physical manner, e.g., writing the same data to each physical location on an identically sized set of storage devices 106, or in a logical manner, e.g., writing data to a physical location of each storage device 106 corresponding to a logical address of the storage set 102.) Accordingly, at a first time point 112, when a write 110 is requested to a particular data set 104 at a particular location 108 in the storage set 102, the storage devices 106 may each perform the write 110 to the requested location 108. However, as further illustrated in this exemplary scenario 100, problems may arise due to the incomplete synchrony of the storage devices 106; e.g., the write 110 to each storage device 106 may be initiated, performed, and completed at different times by different storage devices 106. Such timing differences may arise due to hardware differences (e.g., a first storage device 106 may promptly commit the data set 104 to the physical medium, while a second storage device 106 may first store the data set 104 in a write buffer), but may arise even with identically equipped storage devices (e.g., differences in the input/output queues of different storage devices 106, or differences in the initial sector position of the write heads of different hard disk drives at the beginning of a write request). As a result, at a second time point 114, the writes 110 to two of the storage devices 106 may have completed while a third storage device 106 continues to complete the write 110 (and may, in fact, not yet have started committing the data set 104 to the storage set 102).

Such lapses in the synchrony of storage devices 106 may result in significant problems, e.g., if a failure occurs after the completion of a write 110 by a first storage device 106 and before the completion of the same write 110 by a second storage device 106. For example, at a third time point 116, while a third write 110 is being performed to the storage devices 106, a failure 118 occurs that interrupts the write 110 to all storage devices 106. Even if the failure 118 is temporary (e.g., a momentary loss of power), and even ephemeral, the failure 118 may result in an inconsistency 122 due to the timing differences in the storage device 106 (e.g., the write 110 may have been completed prior to the failure 118 on the first and second storage devices 106, but not on the third storage device 106). While recovering from the failure 118, upon identifying the inconsistency 122 among data sets 104 that are expected to be identical, it may be difficult to choose the determine which data set 108 is accurate. In this exemplary scenario 100, it may be logical to choose the version of the data sets 108 stored on the majority of storage devices 106. However, minor variations of this exemplary scenario 100 may render such a choice less logical; e.g., the inconsistency 122 may arise in scenarios involving an even number of storage devices 106, such that a majority choice may not be available.

In scenarios such as the exemplary scenario 100 of FIG. 1, the inconsistency 122 may apply only to data sets 110 that have recently been written. However, in other scenarios, similar failures 118 may also jeopardize the reliability of data sets 104 that have not been written or even accessed in a long time, and even those stored on other storage devices 106 that were not in use at the time of the failure 118. In the exemplary scenario 200 of FIG. 2, a set of four storage devices 106 are configured in the manner of a RAID 4 scheme, wherein a storage set 102 is allocated across three storage devices 106, and a fourth storage device 106 is configured to store a set of verifiers 202 corresponding to various data sets 104 stored on the first three storage devices 106. The verifiers 202 may comprise a checksum, such as a parity bit that is computed by XORing together the bits stored in a corresponding location on each of the other storage devices 106. (For example, for a one-megabyte data set 104 stored at a particular physical or logical location in the storage set 102 of each storage device 106, each of the one-megabyte data sets 104 may be XORed together to generate one megabyte of parity data that is stored on the fourth storage device 106). This interoperation may enable the storage devices 106 to maintain the integrity of the storage set 102 through some forms of data loss. For example, if any one of the first three storage devices 106 is lost, the portion of the storage set 120 stored on the lost storage device 106 may be reconstructed by XORing together the data stored on the other two storage devices 106 and the corresponding parity data stored on the fourth storage device 106; and if the fourth storage device 106 is lost, the parity data may simply be regenerated onto a replacement storage device 106 from the corresponding data sets 104 stored on the first three storage devices.

In this manner, the interoperation of the storage devices 106 as illustrated in the exemplary scenario 200 of FIG. 2 enables fault-tolerance even in the event of a sudden and permanent loss of any one storage device 106. However, the storage devices 106 in this exemplary scenario 200 also exhibit the incomplete synchrony presented in the exemplary scenario 100 of FIG. 1. For example, at a first time point 204, a write 110 may be initiated to a data set 104 stored on the second storage device 106, which involves updating the verifier 202 for the corresponding data sets 104 stored on the fourth storage device 106. However, the writes 110 may not complete at the same time; e.g., at a second time point 206, the write 110 to the second storage device 106 may have completed, but the write 110 of the verifier 202 on the fourth storage device 106 may not. Moreover, a failure 118 may arise before the latter write 110 completes, and the fourth storage device 106 may retain an incorrect verifier 118. Even if limited and brief, this failure 118 may jeopardize not only the verifier 116 that has been incompletely written to the fourth storage device 106 and the data set 104 stored on the second storage device 106 that was recently but completely written, but the data sets 104 stored on the first and third storage devices 106 that are also represented by the verifier 122. For example, at a third time point 208, the third storage device 106 may experience a failure 118; and at a fourth time point 210, a recovery process may be initiated to reconstruct the data sets 104 on a replacement storage device 118 by XORing together the corresponding data sets 104 on the first and second storage devices 106 and the corresponding verifier 202 on the fourth storage device 106. However, because of the inconsistency 122 caused by the failure 118 of the write 110 to the fourth storage device 106 at the second time point 206, the XORing may result in a reconstruction of incorrect data 212 on the third storage device 106. This incorrect data 212 may be generated even though this data set 104 on the third storage device 106 was not involved in the failure 118 of the write 110, even if this data set 104 has not been written in a long time, and even if the third storage device 106 was not in use or even accessible during the failure 118 of the write 110 to the fourth storage device 106. Thus, the single failure of a write 202 may comprise the fault-tolerant capabilities of the storage set 102 (i.e., despite the implementation of a RAID 4 scheme, the storage set 102 loses the capability to recover from the failure 118 of a single storage device 106). Even more severe consequences may arise in other scenarios; e.g., if the failed write 110 occurred to a data set 104 comprising a master boot record, an entire volume within the storage set 106, possibly comprising the entire storage set 106, may be compromised and inaccessible.

Due to the potentially catastrophic consequences of failures 118 of writes 110, techniques may be utilized to detect and correct resulting inconsistencies 122. As a first such technique, various types of cleaning processes may be utilized to detect inconsistencies in the storage set 102. For example, data sets 104 may be compared with verifiers 202 to detect a mismatch, or copies of data sets 104 that are expected to be identical may be compared. Even data sets 104 that are not associated with another data set 104 or verifier 202 may be examined for inconsistencies, such as data corruption, and may occasionally be automatically repaired. However, a scan of an entire storage set 102 may be inefficient and/or prohibitive in many scenarios. For example, the scan may be protracted due to the size of the storage set 102, the throughput of the storage set 102 (e.g., a geographically distributed storage set 102 may be accessible through comparatively low-throughput network connections), and/or the complexity of the scan (e.g., a math-intensive computation of a sophisticated parity check). During the scan, the storage set 102 remains possibly inconsistent and vulnerable in the event of a failure 118 of a storage device 106 as depicted in the exemplary scenario 200 of FIG. 2, and it may be unwise to allow processes to access to the storage set 102 due to the possibility of providing incorrect data. Such processes may therefore have to be blocked until the scan is complete (or at least until the data sets 104 utilized by the process have been cleaned), resulting in outage of services or downtime. Additionally, this protracted and costly scanning of the entire storage set 102 may be triggered by a potentially brief failure 118 of even a single storage device 106, and may be disproportionate to the number of pending writes 110 during the failure 118. Indeed, even if no writes 110 were in progress at the time of failure 118, a scan of the entire storage set 102 may have to be invoked if the number of pending writes 110 cannot be determined, due to the possibility of an inconsistency 122 that may have catastrophic results.

In view of these considerations, it may be desirable to provide mechanisms to store information about pending writes 110 during the ordinary operation of the storage set 102 in case of a sudden failure 118 of hardware and/or software. This information may be recorded as information about the "dirty" status of the storage set 102 that may present an inconsistency 122 if a failure occurs. Moreover, it may be desirable to record this information in a nonvolatile memory in order to retain the information in the event of a power failure. This tracking may enable a cleaning process invoked after a failure 118, such that the cleaning process may be limited to scanning only the areas of the storage set 102 that were involved in a pending write 110 at a moment of failure 118.

Figure 3:
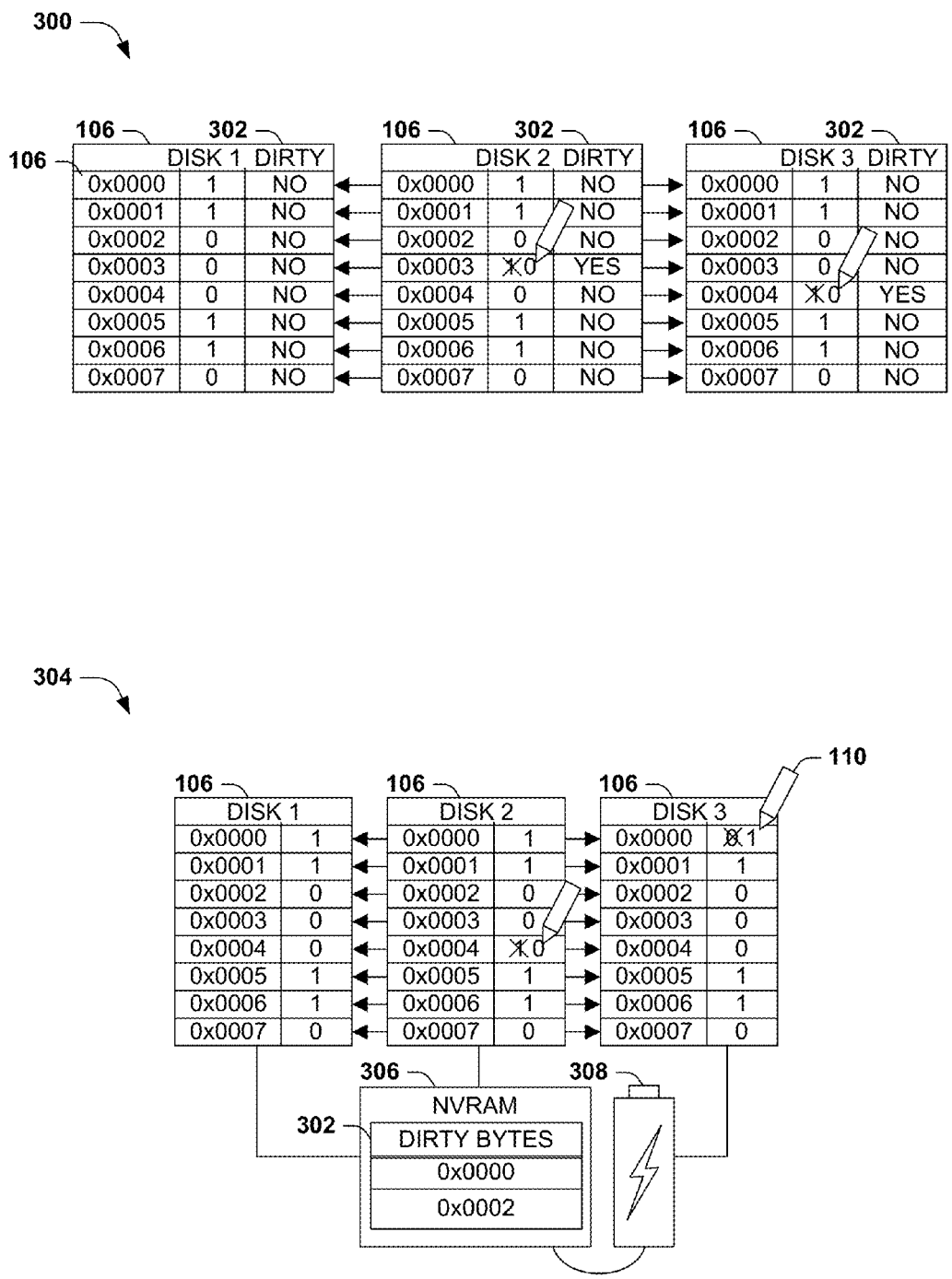
FIG. 3 is an illustration of two techniques that may reduce the incidence of compromised data in the data set caused by a failure, but that may do so with significant costs and/or inefficiencies.

FIG. 3 presents two techniques for recording the "dirty" status in a nonvolatile memory for a storage set 102 provided by a set of storage devices 106. As a first exemplary technique 300, for each bit of data stored in the storage set 102, a "dirty" indicator 302 may be stored that indicates a pending write 202 to the bit. The "dirty" indicator 302 for a bit may be set before initiating the write 202 to the bit, and may be cleared after the write 202 completes. In order to clean the storage set 102, the "dirty" indicators 302 of the bits may be examined, and any "dirty" indicators 302 that are set may initiate a cleaning of the associated bit (e.g., by copying over the inconsistent bit a corresponding bit from an identical copy of the data set 102 stored on a different storage device 106).

This first exemplary technique 300 may present some advantages; e.g., it may be achieve the storage of information about pending writes 104 in a nonvolatile storage medium, may entail a comparatively simple cleaning process involving a small amount of additional hardware or software, and may reduce the computational complexity of the cleaning as compared with other detection methods (e.g., performing an XOR operation on large data sets 104 retrieved from several storage devices 106). However, this first exemplary technique 300 also presents many disadvantages. As a first example, the "dirty" indicators 302 consume half of the storage space of the storage set 102. As a second example, the scanning process still involves scanning the entire storage set 102, and even if the relative simplicity of the scanning detection reduces the computational power involved, the accessing of the entire storage set 102 may still result in a protracted cleaning process. Moreover, if the access rate to the storage set 102 is the bottleneck in the cleaning process, the duration of the cleaning process may be unchanged. As a third example, if the "dirty" indicators 302 are stored in physical proximity with the tracked bits of the storage device 106 (e.g., following each bit or bytes on the physical medium of the storage device 106), a failure 108 resulting in the corruption of a bit may also result in the corruption of the "dirty" indicator 302. Alternatively, if the "dirty" indicators 302 are stored in a different area of the same storage device 106, then a write 202 of any single bit involves three accesses to three different portions of the storage device 106—e.g., a first seek to and access of the area storing the "dirty" indicators 302 to mark the bit as dirty; a second seek to and access of the area storing the bit to perform the write 202; and a third seek to and access of the area storing the "dirty" indicators 302 to mark the bit as clean. These multiple accesses may greatly reduce the performance (e.g., latency and throughput) of the storage device 106. Moreover, the increased physical wear-and-tear involved in regular use of the storage device 106 caused by this variation of tracking the "dirty" bits may inadvertently hasten the physical failure 118 of the storage device 104.

FIG. 3 also depicts a second exemplary technique 304 for tracking "dirty" information for a storage set 102 provided by a set of storage devices 106. This second exemplary technique 304 involves the inclusion of a separate nonvolatile memory 306, e.g., a solid-state storage device comprising a separate battery 308, where "dirty" indicators for respective bytes of the storage set 102 may be recorded. For example, requests for writes 202 of respective data sets 104 may be monitored, recorded in the separate nonvolatile memory 306, and cleared when the write 202 is complete.

This second exemplary technique 304 presents several advantages, both in general and with respect to the first exemplary technique 304 illustrated in FIG. 3. As a first example, because the accessing of the separate nonvolatile memory 306 may occur concurrently with the performance of the write 202 to the storage set 102, the performance (e.g., latency and throughput) of the storage device 106 may be undiminished by the inclusion of this technique. As a second example, storing the "dirty" indicators 306 in a separate portion of memory may avoid reducing the capacity of the storage set 102. As a third example, the separation of the storage of the "dirty" indicators 302 from the physical media of the storage devices 106 may preserve the "dirty" indicators 302 in the event of a failure 118 of the storage set 102; e.g., a physical flaw in a portion of a storage device 106 may not affect the storage or retrieval of the "dirty" indicator 302 for the bytes stored in the flawed portion, and in the event of a power failure, the separate nonvolatile memory 306 may continue to operate using the battery 308. As a fourth example, the cleaning process may be considerably protracted by focusing only on the bytes indicated as dirty in the separate nonvolatile memory 306.

However, this second exemplary technique 304 also presents distinct disadvantages. As a first example, the inclusion of separate hardware significantly increases the cost and complexity of the storage set 102. As a second example, in addition to the possibility of a failure of a storage device 106, the management of the storage set 102 may also have to contend with a failure of the separate nonvolatile memory 306. Moreover, because the separate nonvolatile memory 306 is not stored in the storage set 102, it is not included in mechanisms for promoting the redundancy and fault tolerance of the storage set 102, and a single failure of the separate nonvolatile memory 306 may result in a loss of "dirty" indicators 302 for the entire storage set 102. As a third example, the tracking of "dirty" indicators 302 for respective bytes of the storage set 102 may involve a high number and rate of accesses to the separate nonvolatile memory 306, which may have to provide high throughout and large capacity to satisfy this task. Indeed, the separate nonvolatile memory 306 may have to provide sufficient throughput to record write activities not just for the fastest storage device 106 in the storage set 102, but for the combined rate of activity of all storage devices 106 served by the separate nonvolatile memory 306. As a fourth example, if the separate nonvolatile memory 306 is not integrated with a storage device 106 (e.g., if it is implemented in a RAID controller), the "dirty" indicators 302 may be less portable than the storage devices 106. For example, in the event of an unrelated failure of a RAID controller, the storage devices 106 may be relocated to and accessed by a different RAID controller, but the "dirty" indicators 302 may remain within the separate nonvolatile memory 306 of the failed RAID controller is fully operational. Indeed, it may be unclear to the user why storage devices 106 that were not involved in the failure of the RAID controller may be inconsistent, and may therefore have to be cleaned, when inserted into a separate RAID controller. These and other disadvantages may be exhibited by many techniques resembling those in FIG. 3 for facilitating the recovery of the storage set 102 from a failure 118 by tracking the status of writes 202 to the storage set 102.

B. Presented Techniques

Presented herein are techniques for tracking the status of writes 202 to a storage set 102 provided by a set of storage devices 106 that may enable a rapid cleaning process in a fault-tolerant, performant, and cost-effective manner. In accordance with these techniques, the storage set 102 may be apportioned into regions of a particular region size (e.g., regions of one gigabyte), and a region descriptor may be generated to record the pendency of writes 110 to one or more locations 108 within each region. The region descriptor may be stored on the same storage device 106 where the regions are located, or on a different storage device 106 of the storage set 102. When a request for a write 110 to a particular location 108 is received, an embodiment of these techniques may first identify the region comprising the location 108, and may then determine whether the region indicator of the region comprising the location 108 is already marked as dirty. If not, the embodiment may first update the region indicator to mark the region as dirty; but if so, then the embodiment may proceed with the write 110 without having to update the region indicator. After the write 110 is completed, the embodiment may mark the region indicator of the region as clean. Notably, the embodiment may be configured not to update the region as clean in a prompt manner, but may wait for a brief period before doing so, in case subsequent requests for writes 110 to the same region (either an overwrite of the same location 108, or a write 110 to a sequentially following data set 104 or an otherwise nearby data set 104) promptly follows the first write 110. This delay may avoid a rewriting of the region indicator to "clean" followed promptly by rewriting the region indicator as "dirty," and may therefore economize accesses to the storage device 106 in furtherance of the performance and life span of the storage device 106.

Figure 4:
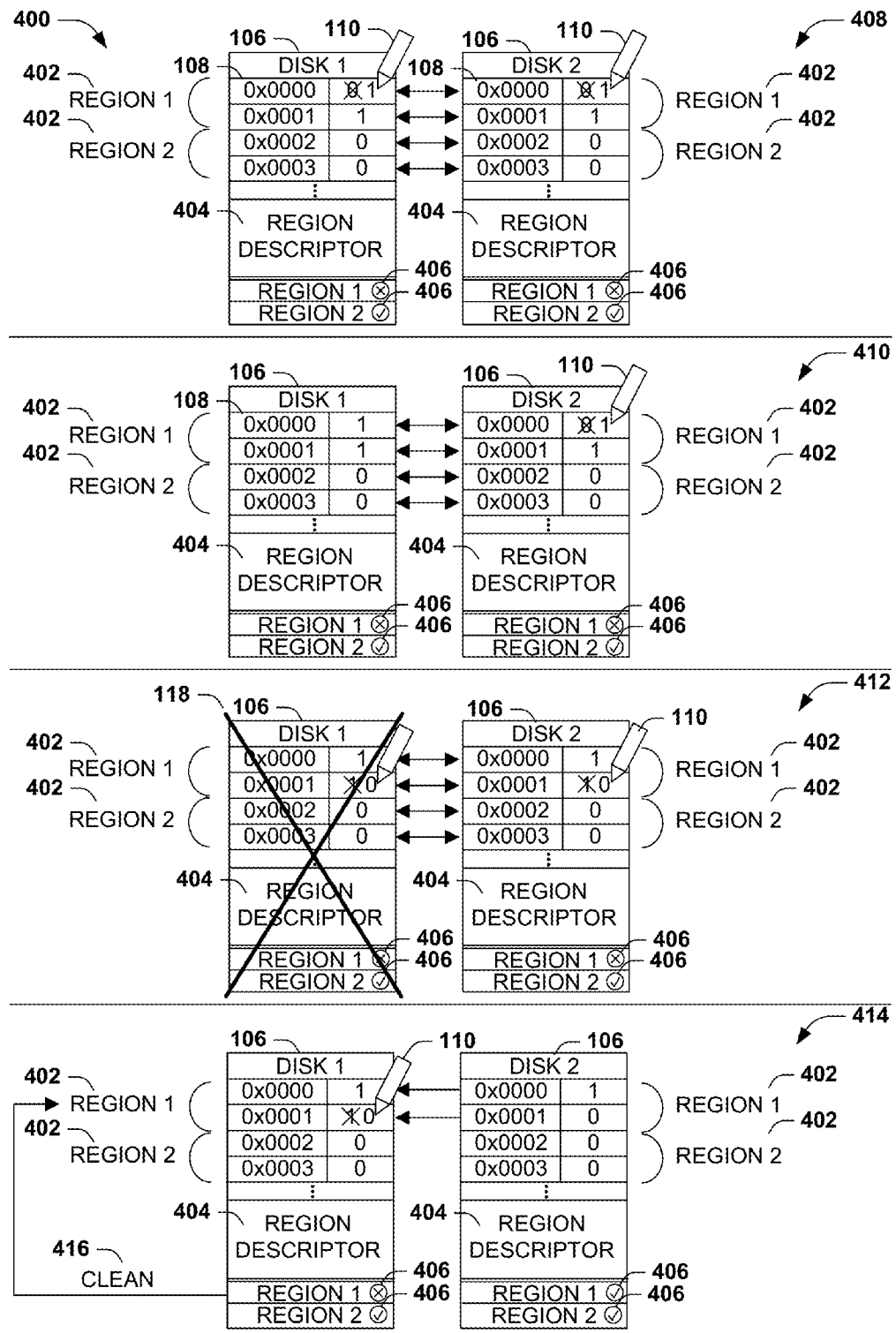
FIG. 4 is an illustration of an exemplary scenario featuring the use of the techniques presented herein to track dirty regions on the physical media of a storage set.

FIG. 4 presents an illustration of an exemplary scenario featuring the tracking of writes 110 pending to a storage set 102 provided by two storage devices 106 according to the techniques presented herein, where the storage devices 106 coordinate to store identical copies of the storage set 102 (e.g., a mirroring of the storage set 102 according to a RAID 1 scheme). In this exemplary scenario 400, and in accordance with these techniques, the storage set 102 provided by the storage devices 106 is apportioned into regions 402 of a region size (e.g., one gigabyte regions). Each region 402 comprises the data sets 104 stored within a set of locations 108 (e.g., a range of addresses) within the storage set 102. On each storage device 106, a region descriptor 404 may be generated, where regions 402 may be marked as "dirty" or "clean" according to the pending or completed status of writes 110 performed upon the data sets 104 comprising the region 402. For example, at a first time point 408, a first write 110 is requested to a first location 108 in the storage set 102, and the storage devices 106 begin performing the first write 110 by first identifying a region 402 comprising the first location 108, and then marking 406 the region 402 as dirty in the region descriptor 404. Having marked the region 402 as dirty, the storage devices 106 then initiate the first write 110 to the location 108 in the storage set 102. At a second time point 410, the first storage device 106 may have completed the first write 110, but may not have yet marked the region 402 as clean in the region descriptor 404. However, because of the imperfect synchrony of the storage devices 106, at the second time point 410, the second storage device 106 may have not yet completed the first write 110.

As further illustrated in the exemplary scenario 400 of FIG. 4, at a third time point 412, a second write 110 may be requested to a different location 108 in the storage set 102. The storage devices 106 therefore identify the region 402 associated with the location 106 of the second write 110, and determine that this location 106 is also within the first region 402. Moreover, because the first region 402 is already marked as dirty in the region descriptor 404, the storage devices 106 refrain from redundantly updating the region descriptor 404. The storage devices 106 then begin performing the write 110, and the second storage device 106 eventually completes the write 110 and then (perhaps after a brief delay, during which no further writes 110 to the first region 402 are requested) updates the region descriptor 404 to mark the first region 402 as clean. However, the write 110 performed by the first storage device 106 is interrupted by a failure 118 (e.g., a temporary disconnection, a software crash, or a power failure). At a fourth time point 414, the first storage device 106 becomes accessible again, and the task of cleaning 416 the first storage device 106 is initiated to ensure the correction of writes 110 that were interrupted by the failure 118 and that, if uncorrected, may present a potentially catastrophic inconsistency 122 in the storage set 102 (e.g., a divergence of the identical copies of the storage set 102 stored on the storage device 106). However, rather than comparing all of the data sets 104 with the corresponding data set 104 of the second storage device 106, the cleaning 416 may utilize the region descriptor 404 and may clean only the regions 402 marked as dirty. Thus, at the fourth time point 414, because only the first region 402 is marked as dirty in the region descriptor 404 of the first storage device 106, the cleaning 416 may compare the data sets 102 of the first region 402 with the corresponding data sets 416 of the second storage device 106, and upon finding an inconsistency, may copy the data set 104 over the incorrect data set 104 on the first storage device 106.

In this manner, the techniques presented herein, of which one example is depicted in the exemplary scenario 400 of FIG. 4, may enable a cleaning 416 of a storage device 106 following a failure 118. Moreover, these techniques achieve this cleaning 416 in an advantageous manner as compared with other techniques, including those illustrated in FIG. 3. As a first exemplary example, the cleaning 416 of the first storage device 106 is limited to the data sets 104 stored in the subset of regions 402 where at least one write 110 had recently occurred at the time of a crash 118; e.g., because the second region 402 has not experienced a write 110 in a while, the second region 402 is not included in the cleaning 416. As a second exemplary advantage, the marking 406 of dirty and clean information for regions 406 comprising a set of regions 402, as well as the deferred marking of such regions 402 as clean following a write 110, may significantly reduce the performance loss caused by the tracking of dirty regions. For example, by leaving the marking 406 of the first region 402 as dirty for a brief period following the first write 110, the storage devices 106 are able to omit marking 406 the region 402 as dirty, only to mark it as dirty again upon receiving the second write 110 to another location 106 within the same region 402, thereby reducing the accesses by each storage device 106 to the region descriptor 404 from three to one. This efficiency gain may not have been achieved if either the dirty region information was tracked per location 108 or if the storage devices 106 promptly updated the region descriptor 404 following each write 110 (e.g., as illustrated in the first exemplary technique 300 of FIG. 3). As a third exemplary advantage, the storage of the region descriptor 404 for regions 406, as opposed to single locations 108, does not significantly reduce the available capacity of the storage devices 106 (in contrast with the first exemplary technique 300 of FIG. 3, wherein 50% of the total capacity of the storage device 106 is used to track the dirty or clean status of the available capacity). As a fourth exemplary advantage, the tracking of dirty regions is achieved without additional hardware, and thus reduces the cost, complexity, power consumption, and opportunities for failure of the tracking techniques as compared with the second exemplary technique 304 of FIG. 3. These and other exemplary advantages may be achievable through the tracking of dirty region information for storage devices 106 providing a storage set 102 in accordance with the techniques presented herein.

C. Exemplary Embodiments

Figure 5:
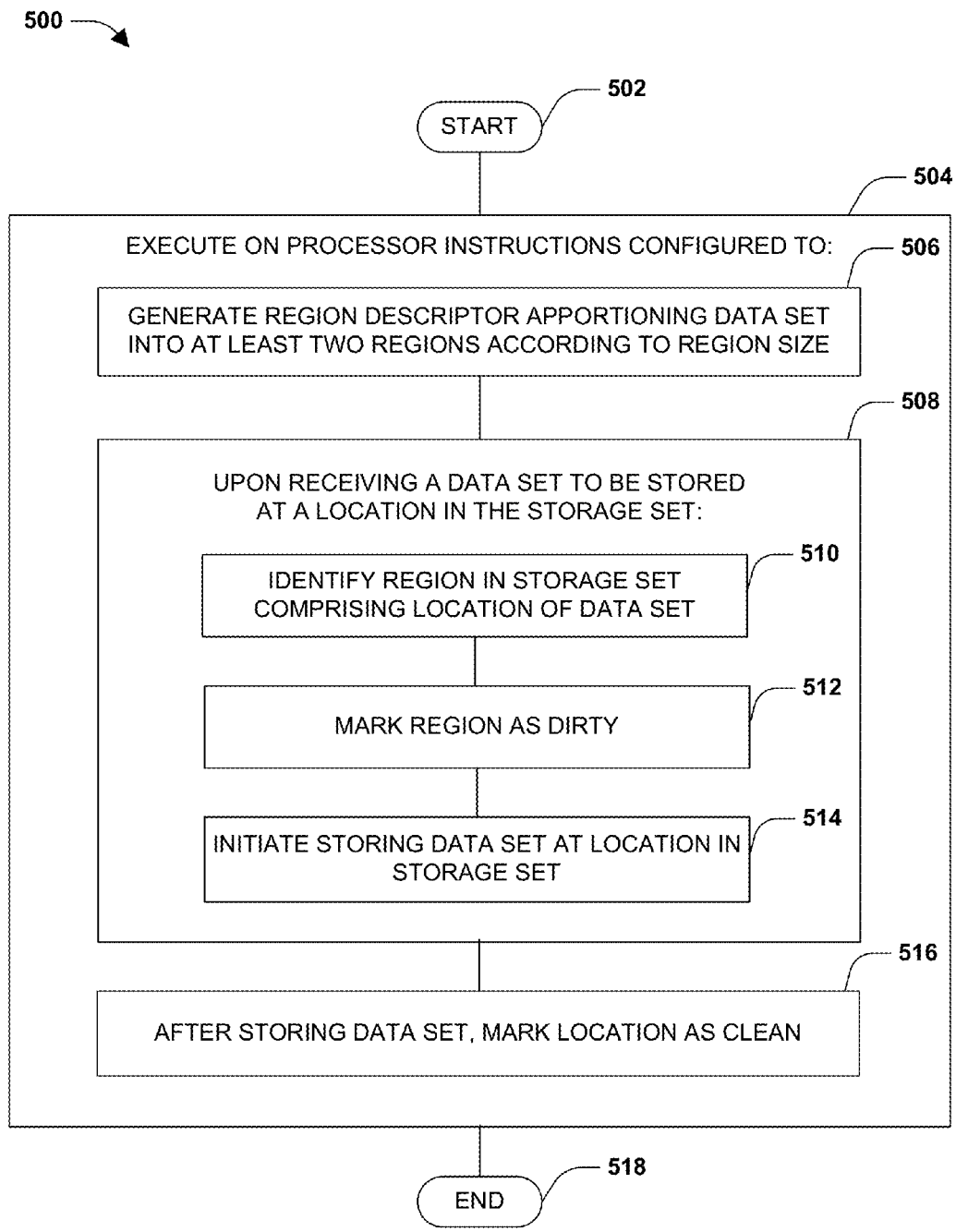
FIG. 5 is a flowchart illustration of an exemplary method of a tracking and nonvolatile media recording of dirty regions of a storage set according to the techniques presented herein.

FIG. 5 presents an illustration of a first exemplary embodiment of these techniques, depicted as an exemplary method 500 of recording pending writes to a storage set 104. The exemplary method 500 may be implemented, e.g., as a set of instructions stored in a memory component of a device (e.g., a memory circuit, a platter of a hard disk drive, a solid-state memory component, or a magnetic or optical disc) that, when executed by a processor of a device, cause the device to perform the techniques presented herein. The exemplary method 500 begins at 502 and involves executing 504 the instructions on the processor. Specifically, the instructions are configured to, on at least one storage device 106, generate 506 a region descriptor 404 apportioning the storage set 102 stored on the storage device 106 into at least two regions 402 according to a region size. The instructions are also configured to, upon receiving 508 a data set 104 to be stored at a location 108 in the storage set 102, identify 510 a region 402 within the storage set 102 comprising the location 108 of the data set 102; mark 512 the region 402 as dirty in the region descriptor 404; and initiate 514 storing the data set 104 at the location 108 in the storage set 102. The instructions are also configured to, after storing the data set 104 at the location 108 in the storage set 102, mark 516 the region 402 as clean in the region descriptor 404. In this manner, the instructions achieve the recording of writes 110 pending within the storage set 102 according to the techniques presented herein, and the exemplary method 500 so ends at 518.

Figure 6:
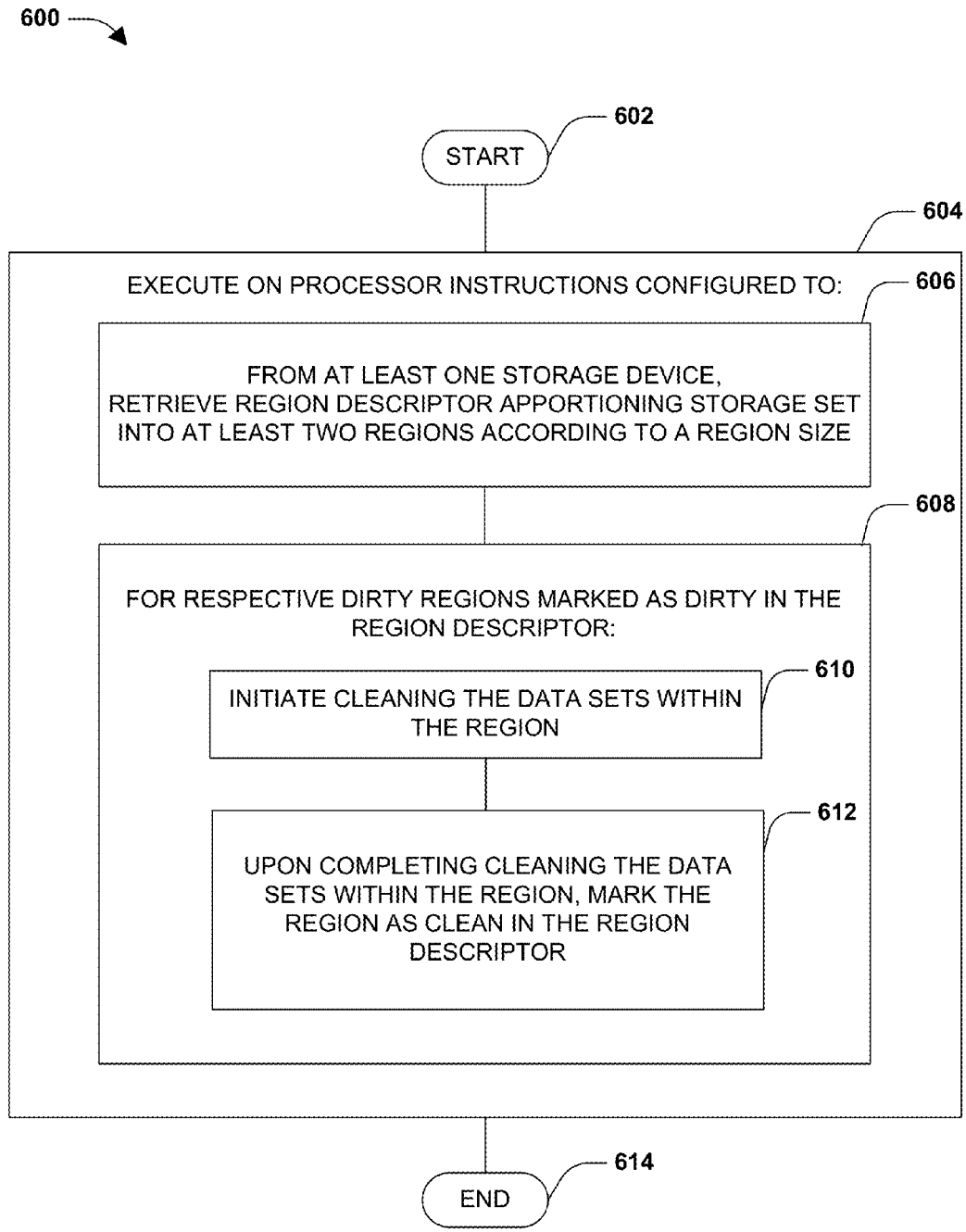
FIG. 6 is a flowchart illustration of an exemplary method of cleaning a storage set according to the dirty regions indicated on the nonvolatile storage medium of the storage set according to the techniques presented herein.

FIG. 6 presents an illustration of a second exemplary embodiment of these techniques, depicted as an exemplary method 600 of cleaning 416 a storage set 102 stored by at least one storage device 106 accessible to a computer having a processor. The exemplary method 600 may be implemented, e.g., as a set of instructions stored in a memory component of a device (e.g., a memory circuit, a platter of a hard disk drive, a solid-state memory component, or a magnetic or optical disc) that, when executed by a processor of a device, cause the device to perform the techniques presented herein. The exemplary method 600 begins at 602 and involves executing 604 the instructions on the processor. Specifically, the instructions are configured to, from at least one storage device 106, retrieve 606 a region descriptor 404 apportioning the storage set 102 stored on the storage device 106 into at least two regions 402 according to a region size. The instructions are also configured to, for respective 608 regions 402 marked as dirty in the region descriptor 404, initiate 610 cleaning 416 the data sets 104 within the region 402; and upon completing cleaning the data sets 104 within a region 402, mark 612 the region 402 as clean in the region descriptor 404. In this manner, the instructions achieve the cleaning of the storage set 102 by correcting inconsistencies 122 caused by writes 110 interrupted by a failure according to the techniques presented herein, and the exemplary method 600 so ends at 518.

Figure 7:
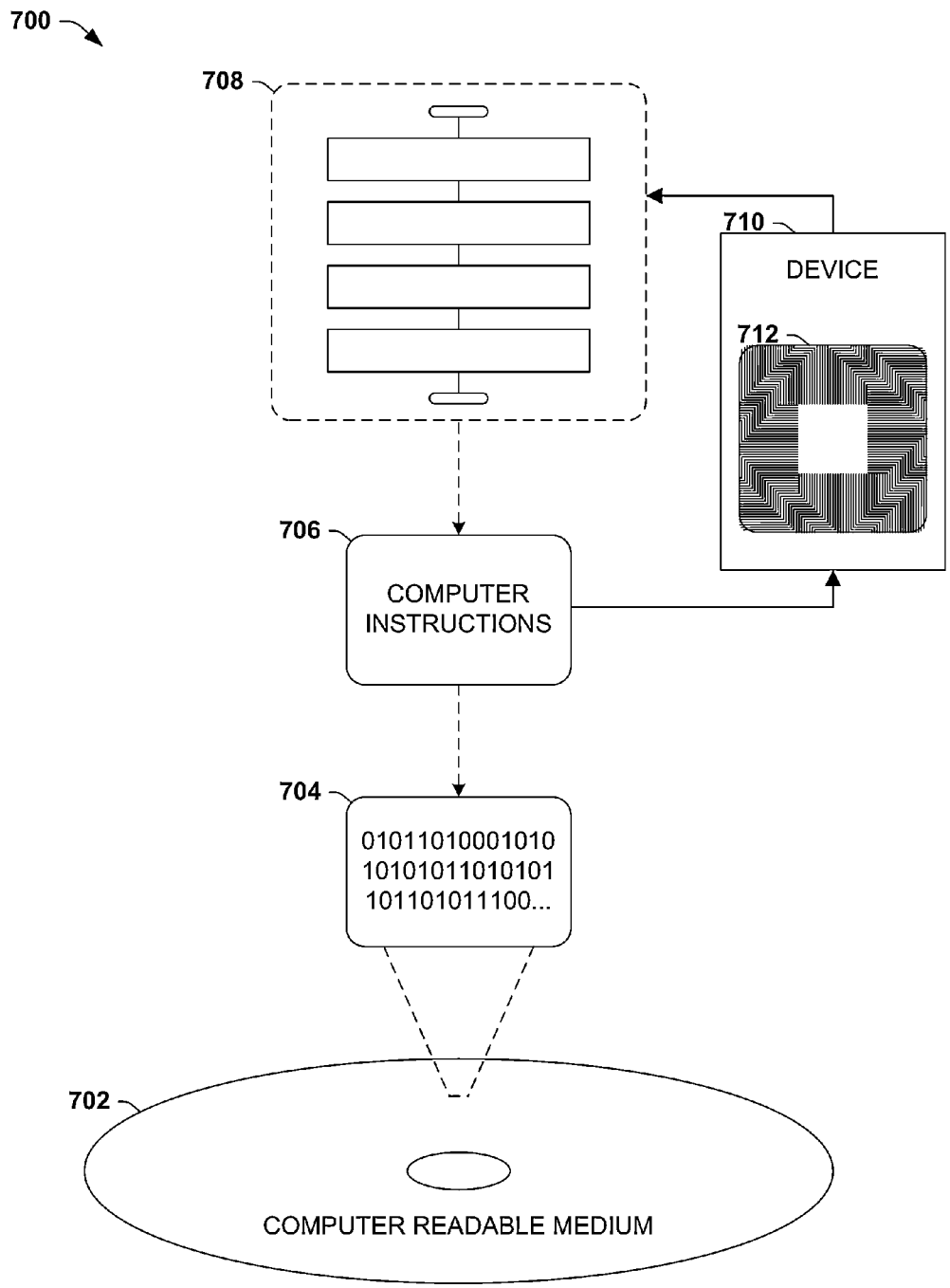
FIG. 7 is an illustration of an exemplary computer-readable medium comprising processor-executable instructions configured to embody one or more of the provisions set forth herein.

FIG. 7 presents a third exemplary embodiment of these techniques, illustrated as an exemplary computer-readable medium 700 comprising processor-executable instructions 702 configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor 712 of a device 710, cause the device 710 to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. In one such embodiment, the processor-executable instructions 702 may be configured to perform a method of recording writes 110 pending to storage devices 106 comprising a storage set 102, such as the exemplary method 500 of FIG. 5. In another such embodiment, the processor-executable instructions 702 may be configured to perform a method of cleaning storage devices 106 comprising a storage set 102 using a region descriptor 404 stored on at least one of the storage devices 106, such as the exemplary method 600 of FIG. 6. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 500 of FIG. 5 and the exemplary method 600 of FIG. 6) to confer individual and/or synergistic advantages upon such embodiments.

D1. Scenarios

A first aspect that may vary among embodiments of these techniques relates to the scenarios wherein such techniques may be utilized. As a first variation of this first aspect, these techniques may be used in conjunction with many types of storage sets 102 comprising various types of data sets 104, including binary storage systems storing various types of binary objects; file systems storing files; media libraries storing media objects; object systems storing many types of objects; databases storing records; and email systems storing email messages. As a second variation of this first aspect, these techniques may be used with many types of storage devices 106, including hard disk drives, solid-state storage devices, nonvolatile memory circuits, tape-based storage devices, and magnetic and optical discs. Such storage devices 106 may also be directly connected to a device 710 (such as a computer) implementing these techniques; may be accessible through a wired or wireless local area network (e.g., an 802.11 WiFi network or ad-hoc connection, or an infrared connection); and/or may be accessible through a wired or wireless wide-area network (e.g., a cellular network or the internet). Moreover, these techniques may be used with two or more storage devices 106 operating independently (e.g., storage devices 106 that are accessed independently through a software process); operating with loose interoperation (e.g., storage devices 106 that operate independently but that are informed of and may communicate with the other storage devices 106 sharing the storage set 102); or operating with tight interoperation (e.g., a Redundant Array of Inexpensive Disks (RAID) controller managing several storage devices 106 as components of a storage system). As a fourth variation of this first aspect, portions or all of these techniques may be implemented within one or more components within the computing environment, such as a set of software instructions stored in a volatile or nonvolatile of a computer or device having access to the storage devices 106 (e.g., an operating system process or a hardware driver); by a storage system configured to interface with the storage devices 106 (e.g., a RAID controller); or in respective storage devices 106 of the storage set 102.

As a fifth variation of this first aspect, many types of cleaning techniques may be used to clean the data sets 104 within a region 102. As a first example, and as illustrated in the exemplary scenario 100 of FIG. 1, the storage set 102 may store (on the same storage device 106 and/or on different storage devices 106) identical copies of a data set 104. In this variation, a mirroring cleaning technique may be used to clean a copy of a data set 104 by comparing it with another copy of the data set 104 to detect and correct inconsistencies 122 (e.g., for respective data sets 104 of the region 402 corresponding with a mirror data set stored in a second region 402 of the storage set 102, synchronizing the data set 104 with the mirror data set). As a second example, and as illustrated in the exemplary scenario 200 of FIG. 2, the storage set 102 may store (on the same storage device 106 and/or on different storage devices 106) verifiers 202 of respective data sets 104, such as a checksum or hashcode, which may be compared with the contents of a data set 104 (and possibly other data sets 104 in the storage set 102) to detect inconsistencies 122. Many types of verifiers may be included in such scenarios. For example, simpler verifiers 202, such as a parity bit, may be efficiently computed for a data set 104, and may lead to a rapid detection of the presence or absence of an inconsistency 122 in a data set 104. Alternatively, complex verifiers 202 may be utilized that present additional features, such as increased reliability, increased detail (e.g., indicating the portion of a data set 104 that is inconsistent), and/or error correction capabilities. In these variations, a verifier cleaning technique may be used to clean a data set 104 by verifying the verifier of the data set 104 to identify and possibly correct inconsistencies 122. As a third example, a data set 104 may be cleaned simply by inspecting the contents, such as corruption of a data set 104 that did not exist at an earlier time. When inconsistencies 122 are detected, reconstruction techniques may be utilized to repair the corrupted data and/or salvage the remaining data in the data set 104. Those of ordinary skill in the art may identify many types and variations of scenarios wherein the techniques presented herein may be useful.

D2. Region Descriptor Structural Variations

A second aspect that may vary among embodiments of these techniques relates to the nature of the region descriptor 404. As a first variation of this second aspect, the storage set 102 may be apportioned into regions 402 identified within the region descriptor 404 in many ways. As a first example of this first variation, the selection of a region size may affect various aspects of these techniques. For example, it may be appreciated (particularly in view of the exemplary techniques illustrated in of FIG. 3) that tracking the dirty or clean state of every location 108 in the storage set 102 may result in a considerable loss of capacity of the storage set 102—perhaps as much as 50%—and, indeed, may not significantly improve the duration of the cleaning process, since scanning the entire storage set 102 to read the dirty and clean bits for each bit may last as long as scanning the entire storage set 102 to detect inconsistencies 122. It may also be appreciated that tracking the clean or dirty status for a very large portion of the storage set 102, such as storing a single "clean" or "dirty" marking 406 for each volume, each partition, or each storage device 106, may not acceptably reduce the highly protracted nature of the recovery, since a write to a single location 206 in a large volume or storage device 106 may lead to a cleaning 416 of the entire volume or storage device 106. In view of these considerations, it may be appreciated that the selection of the region size may considerably affect the performance of the techniques presented herein. However, there may exist a range of acceptable options for the region size, each of which may present some tradeoffs. For example, selecting a larger region size may enable the tracking of "dirty" and "clean" regions at a coarser level of granularity that reduces the consumption of the capacity of the storage set 102 for the use of tracking pending writes 110, and also reduces the frequency with which the region descriptor 404 is updated to mark regions 402 as clean or dirty, but may also entail a longer cleaning 416 after a failure 118, since the marking 406 of a region 402 as dirty results in the cleaning 416 of a larger region 402. Conversely, selecting a smaller region size may result in the tracking of pending writes 110 with finer granularity, enabling a comparatively rapid cleaning 416 after a failure 118 due to more limited and precise specifications of the data sets 104 that are to be cleaned, but may result in greater consumption of the capacity of the storage set 102 (since the region descriptor 404 contains information for more regions 402) and/or a greater performance penalty in the routine operation of the storage set 102 (since a set of writes 110 to various locations 108 is likely to be associated with more regions 402 respectively covering smaller portions of the storage set).

In view of these considerations, many techniques may be used to select or specify the region size(s) of the regions 402 of the storage set 102. For example, a region size may be fixedly defined for a particular storage set 102 or storage device 106. Different region sizes may also be selected for different storage devices 106 (e.g., storage devices 106 used in circumstances where performance characteristics do not significantly affect the computing environment, such as archiving, may use a smaller region size that more significantly reduces performance but provides faster cleaning 416 and recovery from failures 118) and/or for different storage sets 102 (e.g., data for which accessibility is of great value may be tracked using a smaller region size that enables faster cleaning 416 and recovery from failures 118), and may even utilize different region sizes for different regions 402 in the same data set 102. The region size may also be adjusted based on the performance characteristics of the storage devices 106 and/or storage sets 102, and/or based on user preferences. Alternatively or additionally, a user may be permitted to choose a region size; e.g., an embodiment may present several options to a user for region sizes, and may predict a recovery time involved in recovering from a failure 118 in view of each region size. As another alternative, the user may specify a maximum acceptable recovery period, and an embodiment of these techniques may select a region size that likely enables recovery from failures 118 within the maximum acceptable recovery period.

As a second variation of this second aspect, the region descriptor 404 may be structured in various ways, e.g., as an array, a linked list, a table, a database, or a bitmap. Various data structures may present particular advantages. As one such example, for storage sets 102 comprising addresses stored with an addressing system having a single dimension (e.g., as a single, numeric sequence of addresses), the region descriptor 404 may be implemented as a dirty region array, comprising a set of array entries that sequentially correspond to the regions 402 of the storage set 102, and may mark a region 402 as dirty or clean simply by accessing the array entry of the dirty region array, thereby achieving O(1) access time to the marking 406 for any region 402. Alternatively, the region descriptor 404 may be implemented as a sequential journal, where each marking 406 is written in sequence following the previously committed marking 406 regardless of the location 108 in the storage set 102 of the data set 104 so marked. This region descriptor 404 may result in slower read access to the marking 406 for a particular region 402 (since identifying the current marking 406 for an entry entails scanning a significant portion of the journal, and perhaps the entire journal, in order to find an entry), but may enable the further performance advantage of sequential writes to the region descriptor 402. Additionally, the semantics of the contents of the region descriptor 404 may contain information in different ways. For example, the region descriptor 404 may mark a region 402 as "clean" by specifically marking 406 a record or bit representing the region 402, or may do so by evicting from the region descriptor 404 records for regions 402 that have been cleaned. These variations represent a semantic difference about whether a region 402 that does not have a record in the region descriptor 404 has been marked as clean (perhaps recently), or has simply not been marked either dirty or clean (e.g., has not been subjected to a write 104 for a significant amount of time).

Figure 8:
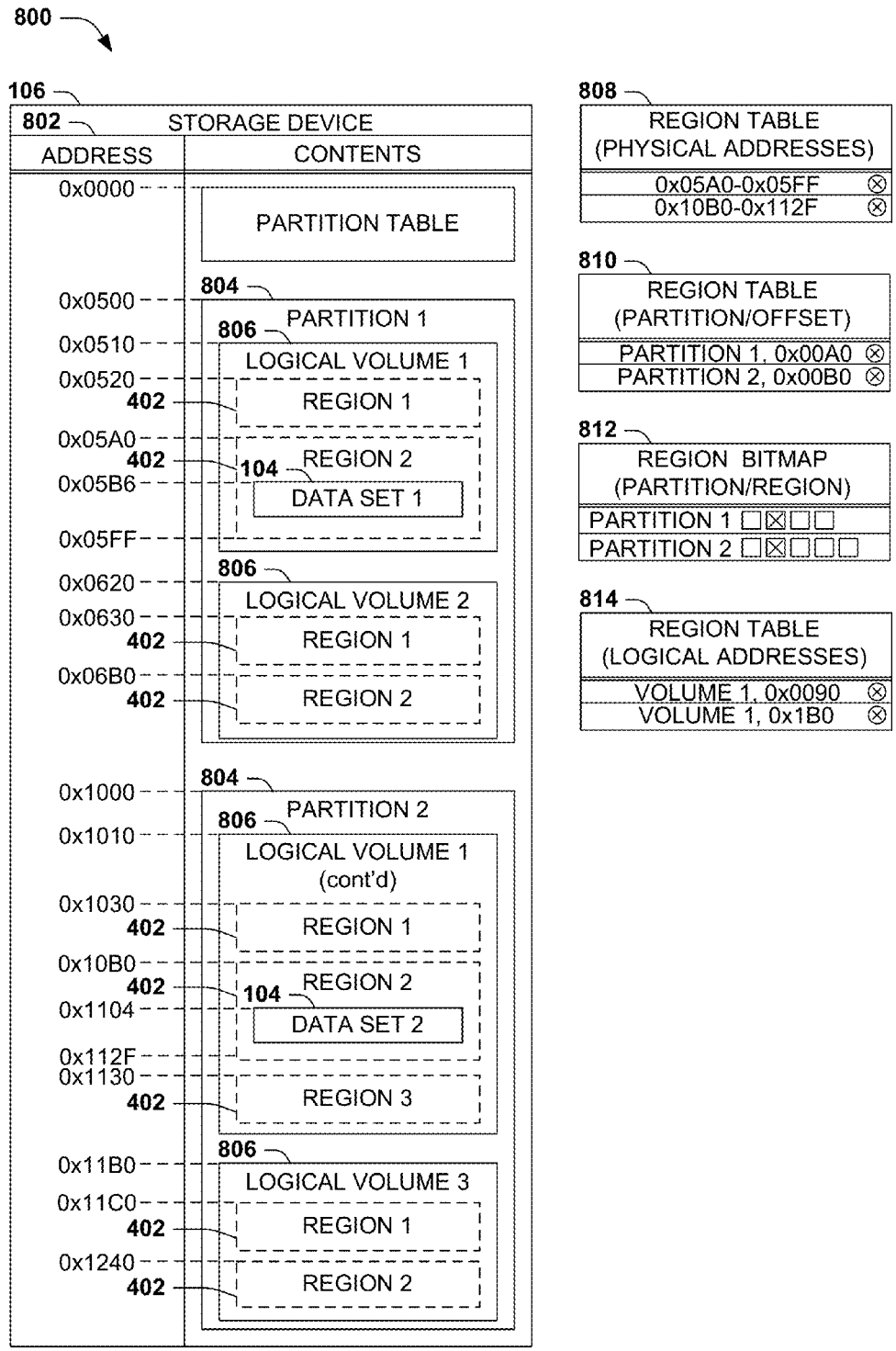
FIG. 8 is an illustration of an exemplary scenario featuring one type of data structure that may be used to track dirty regions on the nonvolatile physical medium of the storage set according to the techniques presented herein.

As a third variation of this second aspect, the region descriptor 404 may indicate the locations 108 of regions 402 within the storage set 102 in various ways. FIG. 8 presents an illustration of an exemplary scenario 800 featuring some different techniques for specifying the locations 106 within a storage set 102 that are represented by respective regions 402. In this exemplary scenario 800, a storage device 106, such as a hard disk drive, is configured to store data comprising at least a portion of a storage set 102. The storage device 106 is configured to store data at respective physical addresses 802, and contains hardware that translates the addresses into physical locations on the storage medium (e.g., a platter, sector, and track). The data stored on the storage device 106 may also be stored according to a standardized format; e.g., the data stored on the physical medium may begin with a partition table, specifying the locations and descriptions of one or more partitions 804, each of which comprises one or more logical volumes 806 (e.g., the drives presented in the operating environment of a computer). The storage set 102 may be stored within one or more logical volumes 806, and may allocate data sets 104 in a logical volume 806 or across several logical volumes 806. Accordingly, a region descriptor 404 may identify regions 402 for various locations 108 within the storage set 102 in various ways. For example, the region descriptor 404 may utilize a physical region referencing scheme that identifies physical locations of respective regions 402 on the storage devices 106 of the storage set 102. As a first such example, the region descriptor 404 may be implemented as a first region table 808 comprising records that indicate a range of physical locations 106 on the storage medium of the storage device 106 that are represented by each region 402. As a second such example, the region descriptor 404 may be implemented as a second region table 810 comprising records indicating, for respective regions 402, the partition 804 and the offset within the partition 804 where each region 402 begins. The region descriptor 404 may also store and represent the region size(s) of one or more regions 402 (e.g., as part of a region record or a separate descriptor of the storage set 102). As a third example, the region descriptor 404 may be implemented as a region bitmap 812, where partitions 804 may be apportioned into a series of regions 402 of a particular region size, and the bitmap may store a one-bit indicator of the "dirty" or "clean" status of the region 402. Alternatively, the region descriptor 404 may utilize a logical region referencing scheme that identifies logical locations of respective regions 402 within the logical arrangement of data in the storage set 102. As one such example, the region descriptor 404 may be implemented as a third region table 814 that identifies the logical location within each logical volume 806 where each region 402 begins. It may be appreciated that addressing techniques that are more closely identified with the physical locations 106 on the storage medium of the storage device 106 may involve little computation for the storage device 106 but more computation for processes that access the regions 402 logically, and vice versa.

As a fourth variation of this second aspect, embodiments of these techniques may be configured to store the region descriptor 404 in various locations on the storage device 106. As a first example of this fourth variation, the region descriptor 404 may be stored in a particular location on the storage device 404 (e.g., at the top of a partition 804 storing data sets 104 of the storage set 102, or at a defined location outside of the partitions 804 storing the data sets 104). As a second example of this fourth variation, the region descriptor 404 may be stored on a first storage device 106 to track pending writes 110 to regions 402 of a second storage device 10.

As a fifth variation of this second example, an embodiment of these techniques may be configured to store two or more region descriptors 404 for the storage set 102. As a first example of this fifth variation, two or more identical copies of a region descriptor 404, representing the same set of regions 402 of the storage set 102, may be stored on the same and/or different storage devices 106. The storage of identical copies may improve the fault tolerance of the storage set 102 (e.g., in the event of an unrecoverable failure of a storage device 106, a failure of a portion of a storage device 106 storing the region descriptor 404, or a corruption of the data within a region descriptor 404, such as the occurrence of a failure 118 while performing a write 110 to the region descriptor 404), recovery from a failure 118 may be performed through the use of another copy of the region descriptor 404. It may be appreciated that while a failure of the region descriptor 404 is unlikely to be catastrophic, because a full cleaning 416 of the storage set 102 may be performed as a backup measure, it may nevertheless be advantageous to store a second copy of the region descriptor 404 in order to expedite the recovery even if the first copy becomes corrupt or unavailable. Additionally, it may be advantageous to store the identical copies of the region descriptor 404 on multiple storage devices 106, and/or in different areas of the same storage device 106 (e.g., in the event of damage to a portion of a storage device 106 where a first copy of the region descriptor 404 is stored, such as a first physical sector or a first portion of a file system, a second, identical copy of the region descriptor 404 that has been stored in a different portion of the storage device 106 may be retrievable and usable).

As a second example of this fifth variation, multiple copies of the region descriptor 404 for a particular set of regions 402 may be stored on one or more storage devices 106, but rather than being identical at all times, the region descriptors 404 may be updated sequentially to reflect the clean and dirty state of the storage set 102 at different times. This sequential updating may be advantageous, e.g., if a failure 118 occurs while updating a copy of the region descriptor 404 that leaves the region descriptor 404 in an inconsistent or corrupt state, because the other copy may be available for use in the cleaning 416 and recovery. As a first scenario for this second example, two copies of the region descriptor 404 may be retained on a storage device 104 that both represent the same set of regions 402; but in order to update the region descriptors 404, a first update may occur by overwriting one copy of the region descriptor 404, and the following update may occur by overwriting the other copy of the region descriptor 404. Moreover, when an embodiment of these techniques overwrites a region descriptor 404, the embodiment may also write a verifier 202 (e.g., a checksum) for the region descriptor 404, and a sequence indicator (e.g., an incrementing integer, or the time of the overwriting). Following a failure 118, the embodiment may examine all of the available region descriptors 404, and may select for use in the cleaning the region descriptor 404 having the highest sequence indicator (e.g., the highest incrementing integer, or the latest time of writing) that is also valid according to its verifier 202. It may be appreciated that performing the cleaning 416 using a slightly stale version of the region set may not result in the failure to clean a region 402 having an inconsistency 118 (e.g., a false negative), because a write 110 to a region 402 only commences after the marking 406 of the region 402 is fully committed to the storage set 102 in the form of a fully written region descriptor 404 having a highest sequence indicator and a valid verifier 202, so a failure 118 while writing the region descriptor 406 does not result in the failure to record a pending write 110. Conversely, using a stale region descriptor 402 may result in a false positive (e.g., a failure 118 during the writing of a region descriptor 404 may result in the loss of a marking 404 of a formerly dirty region 404 as clean, and the region 404 may incorrectly be treated as dirty during the recovery due to the marking 406 found in the stale region descriptor 404), but this inaccuracy simply results in a marginally protracted recovery involving the cleaning 416 of a region 404 that was known to be clean.

Alternatively or additionally, two or more copies of a region descriptor 404 for a set of regions 402 may be redundantly stored on each of the storage devices 106 of a storage set 102. In order to update the region descriptor 404 for the storage set 102, an embodiment may initiate an overwriting of the region descriptor 404 in parallel on all of the storage devices 106. Additionally, each storage device 106 may include a verifier 202 and a sequence indicator with the region descriptor 404 in case a failure 118 occurs while one or more of the storage devices 106 is updating the region descriptor 106. The recovery from a failure 118 of one or more storage devices 106 of the storage set 102 may involve first examining all of the available region descriptors 106 to identify, among all of the copies that are validated by the respective verifiers 202, the copy having the highest sequence indicator. Indeed, it may be advantageous to configure the storage set 102 to store two copies of the region descriptor 494 on each storage devices 106; e.g., in the event that a failure 118 occurs while updating the region descriptors 404 on all of the storage devices 106, the slightly stale copy on any storage device 106 may be usable. Alternatively, it may be similarly advantageous not to update all of the region descriptors 404 at the same time, but to perform a first update of the region descriptors 404 to the copies stored on a first subset of the storage devices 106, and to perform a following update of the region descriptors 404 to the copies stored on a second subset of storage devices 106.

As a third example of this fifth variation, a storage set 102 may include two or more region descriptors 404 that respectively record updates to different regions 402 of the storage set 102. As a first such example, a first region descriptor 404 may record dirty and clean region information for regions 402 of the storage set 102 stored on the first storage device 104, and a second region descriptor 404 may record dirty and clean region information for regions 402 of the storage set 102 stored on the second storage device 104. As a second such example, after apportioning the storage set 102 into regions 402, an embodiment of these techniques may generate two or more region descriptors 404 that each stores the "dirty" and "clean" information for a region set, comprising a subset of regions 402 (irrespective of the physical locations of those regions 402 among the storage devices 106 of the storage set 102), may be generated and stored on one or more storage devices 106. The apportionment of regions 402 into region sets may be selected, e.g., in view of the characteristics of the respective data sets 104 (e.g., a first region set may comprise regions 402 storing more valuable or sensitive data, while a second region set may comprise regions 402 storing less valuable data). Alternatively or additionally, such distribution of the regions over two or more region descriptors 404 may be achieved explicitly (e.g., by generating two or more independent region descriptors 404 that each represents a designated set of regions 402) or implicitly (e.g., by distributing the storage space for the region descriptor 404 across two or more allocations of space, such as two or more storage devices 106). Moreover, in some scenarios, it may be desirable to track dirty and clean information only for a subset of regions 402 of the storage set 102; e.g., regions 402 comprising data that is disposable, such as a cache or index that, if corrupted, may be regenerated from other data of the storage set 102, may not be tracked at all.

As a sixth variation of this second aspect, the region descriptor(s) 404 may be stored in a manner compatible with the synchronization techniques of the storage set 102 may provide various features and advantages to the region descriptors 404, such as increased performance through the capability of accessing any identical copy of the region descriptor

404 on different storage devices 106, and/or similar fault tolerance as the storage set 102 (e.g., if the storage set 102 implements a fault-tolerant storage technique, such as a capability of recovering from a failure of storage devices 106 within a storage device failure tolerance, the region descriptor 404 may be stored using the same fault-tolerant storage technique). Alternatively, a region descriptor 404 may be stored in a manner that enables a separate set of techniques; e.g., respective region descriptors 404 may be stored with a region descriptor verifier of the region descriptor 404 and updated when a region 402 is marked as "clean" or "dirty" in the region descriptor 404, and may therefore enable a verification of the integrity of the region descriptor 404. Those of ordinary skill in the art may conceive many types and formats of region descriptors 404 that may be generated and utilized according to the techniques presented herein.

D3. Region Descriptor Usage Variations

A third aspect that may vary among embodiments of these techniques relates to the usage of the region descriptor 404 to mark regions 402 of the storage set 102 as clean or dirty. As a first variation of this third aspect, the use of the region descriptor 404 may be designed to facilitate management of the capacity of the region descriptor 404. In some types of region descriptors 404, the capacity may not change as regions 402 are marked, such as the region bitmap 814 in the exemplary scenario 800 of FIG. 8; however, in other scenarios, the marking 406 of regions 402 may affect the capacity of the region descriptor 404, such as in the region tables depicted in the exemplary scenario 800 of FIG. 8. For example, if the region descriptor 404 stores records for respective regions 402, the region descriptor 404 may mark a region 402 as "clean" by simply evicting the record. Alternatively, the region descriptor 404 may continue to store records for regions 402 marked as "clean," and may evict the records for "clean" regions 402 at a later time (e.g., after a specified period time has passed without another write 110 to the region 402, or when the capacity of the region descriptor 404 is exhausted). As a second example of this third aspect, the capacity of the region descriptor 404 may be allocated statically (e.g., a fixed-size region descriptor 404) or dynamically (e.g., a resizable region descriptor 404 that is initially allocated with a region descriptor space, but that may be expanded upon filling the region descriptor 404 with records for regions 402 that together exhaust the capacity of the region descriptor 404).

As a second variation of this third aspect, the use of the region descriptor 404 may be selected to reduce the number and frequency of writes 110 to the region descriptor 404. For example, because the region descriptor 404 is stored on the physical medium of one or more storage devices 106, updating the region descriptor 404 may add a seek and write 110 to the region descriptor 404 in addition to the seek and write 110 to the location 108 of the data set 104. Thus, if the region descriptor 404 is promptly and automatically updated to reflect changes to the "dirty" and "clean" marking 406 of various regions 402, the inclusion of the region descriptor 404 may considerably diminish the performance of the storage device 106 and the storage set 102, possibly increasing the cost of each access by up to three times. Even further performance degradation may occur if an embodiment of these techniques accesses the region descriptor 404 to read the "clean" and "dirty" status of respective regions 402 (e.g., in order to first determine whether a region 402 is marked as "clean" before marking 406 it as "dirty"). Accordingly, it may be desirable to reduce accesses to the region descriptor 404.

As a first example of this second variation, it may be appreciated that the semantics of marking 406 a region 402 as "clean" and "dirty" are somewhat asymmetric. For example, it may not be acceptable to defer an access to the region descriptor 404 to mark it as "dirty," since such delay may incorrectly list the region 402 as clean if a failure occurs during the deferment (thereby presenting the false negative situation where a region 402 that may be inconsistent due to an incomplete write 110 during a failure 118 is marked as clean, and therefore is excluded from a cleaning 416 during a recovery from the failure 118). However, it may be acceptable to defer marking 406 a region 402 as "clean" after writes have been completed. This scenario simply leads to a false positive result, where a region 402 that was known to be clean (e.g., no pending writes 110) at the time of failure 118 is included in a cleaning 416 during the recovery—but this scanning may only marginally increase the duration of the cleaning 416 (particularly if the region size is small), and does not compromise the integrity of the storage set 102. Moreover, an embodiment that promptly marks a region 402 as "clean" after the completion of a write 110 may shortly thereafter receive another request for a write 110 to a data set 104 in the same region 402 (e.g., a sequentially following data set 104 or an overwrite of the same data set 104), and may have to re-mark the region 402 as "dirty." Both markings 406, each involving an access to the region descriptor 404, may be avoided by deferring the marking 406 of regions 402 as "clean" for a brief period, while the possibility of an imminent second write 110 to the region 402 may be elevated.

In view of these considerations, an embodiment of these techniques may be configured to defer the marking 406 of regions 402 as "clean" following the completion of writes 110 to the data sets 104 stored in the region 402. The implementation of deferred commitment of "clean" markings 406 to the region descriptor 404 may be achieved in various ways. As a first such example, this deferment may be implemented by providing a volatile memory a write buffer that stores only "clean" markings 406 and (periodically or upon request) committing all such writes as one batch. For example, the embodiment may be configured to, upon completing storing a data set 106 at a location 108 within a region 402, identify the region 402 as clean; and may mark the cleaned regions 402 as clean in the region descriptor 404 on the storage device 106 upon receiving a request to mark cleaned regions 402 as clean in the region descriptor 404. This request may comprise, e.g., a specific request by a process (including the operating system of the device) to flush the markings 406, or may be triggered by various criteria, such as a cleaned duration criterion (e.g., committing the markings 406 of regions 402 periodically) or a region descriptor capacity criterion involving the dirty region capacity of the region descriptor 404 (e.g., committing the markings 406 of regions 402 when the region descriptor 404 reaches a particular capacity, such as a designated number of "clean" markings 406 or a threshold of total available capacity of the region descriptor 404, which may prompt the eviction of "clean" records 406). As a second such example, the deferment may involve holding a "clean" marking 406 for a brief duration, and only committing the "clean" marking 406 to the region descriptor 404 after a brief duration when no subsequent writes 110 are requested to the same region 402. Thus, an embodiment may, upon receiving a request to write 110 to a location 108 in a region 402, first determine whether the region 402 is already marked as clean in the region descriptor 404, and then mark the region 402 as dirty only upon determining that the region 492 is presently marked as clean in the region descriptor 404.

As a third example of this second variation, an embodiment of these techniques may reduce the number of accesses to a region descriptor 404 by implementing a volatile memory representation of the region descriptor 404. For example, in addition to storing the markings 406 of respective regions 402 on the physical medium of a storage device 106, an embodiment of these techniques operating on a device may also store the markings 406 in the volatile memory of the device. The use of this representation may facilitation the deferred writing of batches of "clean" markings 406, and the determination of whether a region 406 that is to be marked "clean" is currently marked "clean" or "dirty" in the on-media region descriptor 404. Thus, the representation may indicate that in addition to regions 402 marked as clean in the region descriptor 404 on the storage device 106 and in the volatile memory representation, and regions 402 marked as dirty in the region descriptor 404 on the storage device 106 and in the volatile memory representation, some regions 402 may be marked as dirty in the region descriptor 404 but may be (temporarily) marked as clean in the volatile memory representation, and such clean markings 406 may later be committed to the on-media region descriptor 404.

Figure 9:
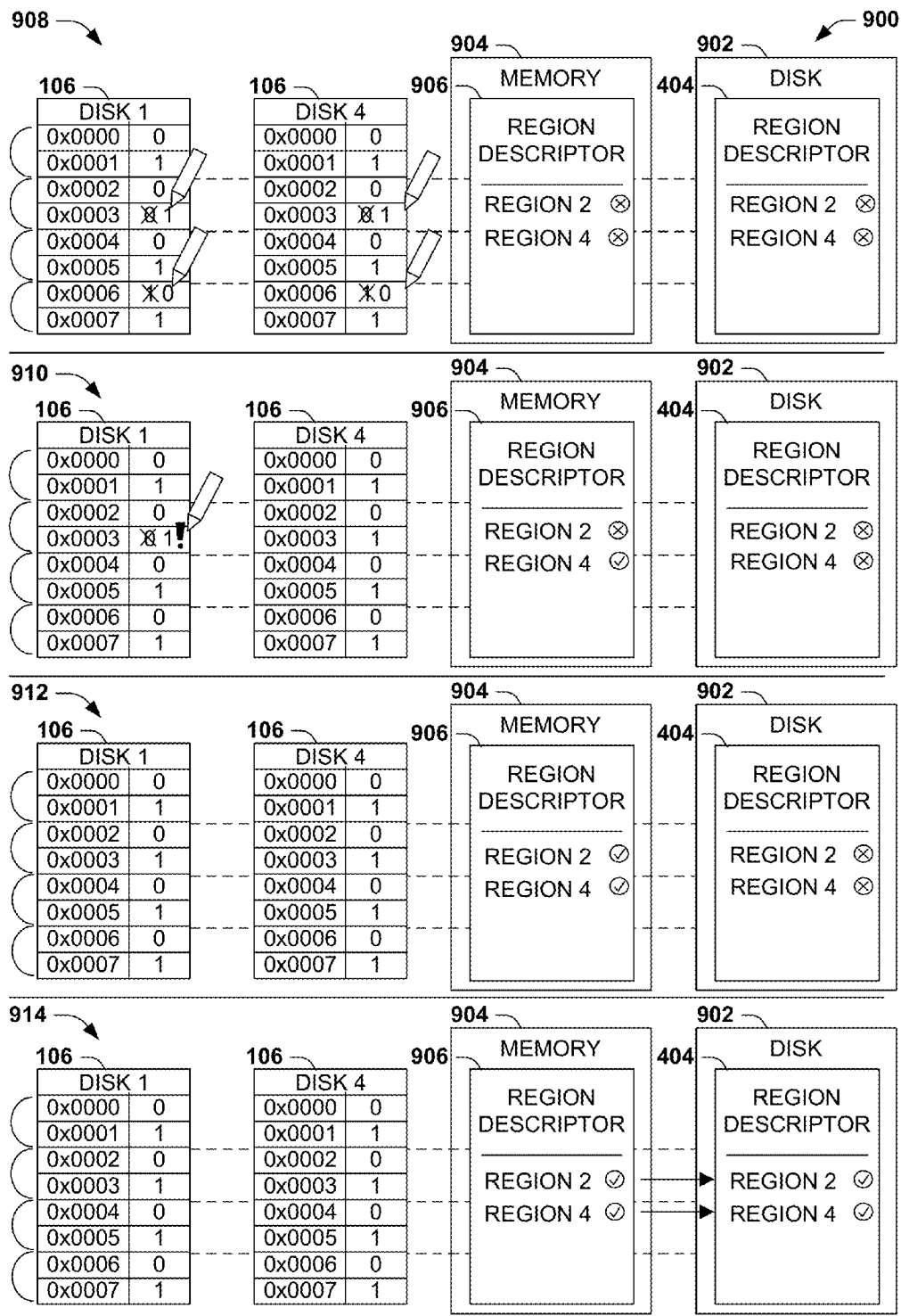
FIG. 9 is an illustration of an exemplary process for updating a dirty region table on a storage device to track dirty regions of a storage set in accordance with the techniques presented herein.

FIG. 9 presents an illustration of an exemplary scenario 900 featuring the implementation and use of a volatile memory representation 902 of the region descriptor 404. In this exemplary scenario 900, two storage devices 106 are configured to mirror a storage set 102 by storing identical copies of the data sets 104 thereof (e.g., in the manner of a RAID 1 scheme), and in order to overcome the potential problems caused by the imperfect synchrony of the storage devices 106, a region descriptor 404 may be generated on a storage device 902 (e.g., one or both of the storage devices 106 storing the storage set 102, and/or another storage device 106) and utilized to track writes 110 pending to various regions 402 of the storage set 102 in accordance with the techniques presented herein. However, in addition, in a volatile memory 904, a representation 906 of the region descriptor 404 may be generated and may interoperate with the region descriptor 404 stored on the storage device 902. For example, at a first time point 908, writes 110 may be pending to data sets 104 apportioned within the second and fourth regions 402 of the storage set 102. Upon receiving the requests for the writes 110, an embodiment of these techniques may mark the regions 402 as dirty in the region descriptor 404 stored on the storage devices 902, as well as in the representation 906 in the volatile memory 904, and may also promptly mark the regions 402 as dirty. However, at a second time point 910, when the writes 110 to the fourth region 402 have completed on both storage devices 104, the fourth region 402 may be marked as clean in the representation 906 in the volatile memory 904, but may not yet be marked as clean in the region descriptor 404 on the storage device 902. Similarly, at a third time point 912, the writes 110 to the second region 402 have completed on both storage devices 104, and the second region 402 may be marked as clean in the representation 906 in the volatile memory 904, but not in the region descriptor 404 on the storage device 902 until a fourth time point 914, when both regions 402 may be together marked as clean in the region descriptor 404 on the storage device 902. This use of the representation 906 in the volatile memory 904 may present several performance improvements (e.g., enabling more rapid determination of which regions 402 are marked as clean or dirty than determinations that access the region descriptor 404 stored on the storage device 902; enabling a batched commitment of the clean markings 406 to the region descriptor 404 stored on the storage device 902; and reducing the number of accesses to the storage device 902, such as, in the event that an additional write 110 to the second region 420 is received at the third time point 912, the region 402 may simply be marked as dirty in the representation 906 in the volatile memory 904 rather than marking 406 the region 402 as clean and then dirty again in the region descriptor 404 stored on the storage device 902).

Figure 10:
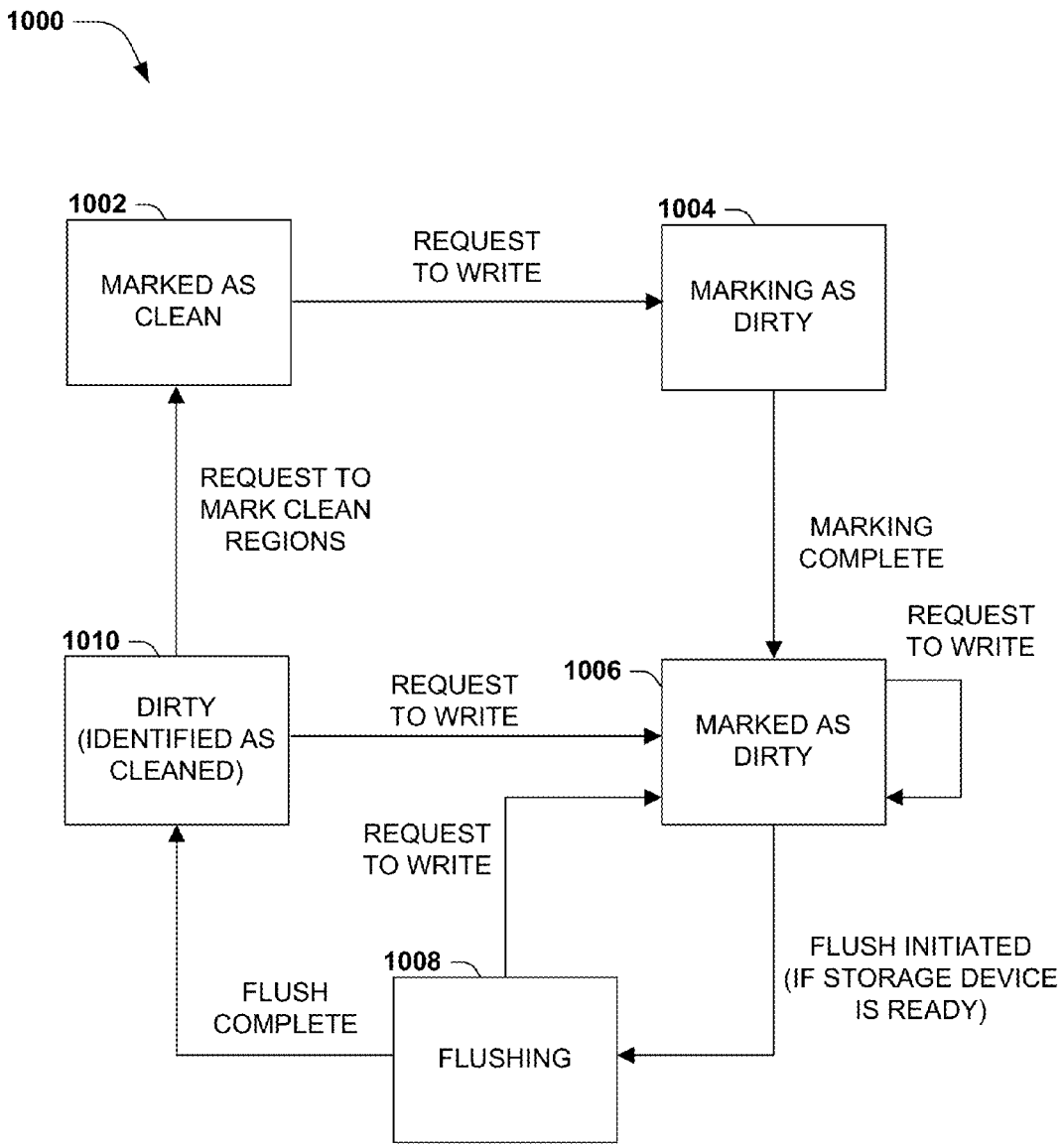
FIG. 10 is an illustration of an exemplary state machine embodying the process of tracking dirty regions of a storage set in accordance with the techniques presented herein.

FIG. 10 presents an illustration of an exemplary state diagram 1000 that may be utilized by an embodiment of these techniques to update a region descriptor 404 in a deterministic manner. Initially, an embodiment of these techniques may be in a clean state 1002 where a clean region 402 is marked as clean in the region descriptor 404, until a request is received to perform a write 110 to a data set 102 at a location 108 within the region 402, and an embodiment of these techniques may transition to a marking state 1004 while marking 406 the region 402 as dirty (e.g., while writing to the region descriptor 404 stored on a storage device 106). When the marking 406 is complete, the embodiment may transition to a dirty state 1004 where the region 402 has been marked as dirty, and further requests to write 110 to additional locations within the region 402 may cause the embodiment to remain in this dirty state 1004. When a request is received to flush the dirty regions 402, a determination is made as to whether the storage device 106 is ready for flushing (e.g., if the storage device 106 is currently performing a synchronization of the storage set, or if the storage device 106 is temporarily inaccessible, then requests to flush dirty writes are held until the storage device 106 is ready). If the storage device 106 is ready for a flush, the embodiment may enter a flushing state 1008 while commencing a flush operation. If the flush operation completes without receiving another request for a write 110 to the region 104, the embodiment may enter a marked as clean state 1010, wherein the region 102 has been flushed (e.g., the writes 110 to the region 402 have completed), but the region 402 is still marked as dirty in the region descriptor 404 on the storage device 106 (but may be marked as clean in a volatile memory representation 906 in the memory 904 of the device). Finally, when a request is received to mark cleaned regions 402 as clean in the region descriptor 404, the embodiment may commence with this marking 406, and upon completing this marking 406 may return to the clean state 1002. However, if any requests to write 110 to the region 402 are received during the flushing state 1008 or the marked as clean state 1010, the embodiment may return to the dirty state 1006. In this manner, an embodiment of these techniques may update the region descriptor 404 in a stateful, deterministic, and comparatively simple manner. Many variations in the updating of the region descriptor 402 may be devised by those of ordinary skill in the art that may be compatible with the techniques presented herein.

D4. Recovery Variations

A fourth aspect that may vary among embodiments of these techniques relates to the manner of using a region descriptor 404 to perform a recovery (including a cleaning 416) of a storage set 102 in the event of a failure 118. As a first variation, the recovery may involve many types of techniques for cleaning 416 the storage set 102 to detect and remove inconsistencies 122 in the storage set 102 arising from the failure 118. As a first example, for a data set 104 of the storage set 102 that is stored as two or more copies that are expected to be identical, the cleaning 416 may involve comparing the copies to detect inconsistencies 122 (e.g., a bitwise comparison of the actual content; a logical comparison of the content, such as a detection of equivalence among the data sets 104 even in the case of insubstantial structural differences, such as two file systems that comprise the same set of files but represent the file system with different bitwise structures; or a comparison of hallmarks of the data sets 104, such as the comparison of a hashcode calculated against the contents of each copy). As a second example, the cleaning 416 may involve verifying one or more data sets 104 against a verifier 202 representing the data sets 104, such as a checksum, to verify the consistency of the contents of the data sets 104. As a third example, the cleaning 416 may simply involve examining a data set 104 for errors, such as verifying that the binary contents of a data set 104 of a standardized type presents a valid structure according to a formal definition. Additionally, the cleaning 416 may enable a simple detection of the presence of an inconsistency 112; may enable an identification of the location of an inconsistency 122 within and/or among the at least one compared data set 104 (e.g., not only detecting that an error exists, but that a particular portion of the data set 104 is inconsistent or not as expected); and/or may enable a correction of the inconsistency 122 (e.g., an error-correcting checksum, such as a Hamming code, that enables a determination of the correct data, or a repair technique applied to a binary object that enables a correction of the formatting inconsistencies and may restore or reduce data loss). Different types of cleaning 416 may be applied to different data sets 104 within the storage set 102 (e.g., more valuable data sets 102 may be stored in a manner compatible with more complicated but sophisticated error-correction techniques, while less valuable data sets 102 may be stored in a manner that is simple and comparatively uncomplicated). Additionally, the type of cleaning 416 invoked may depend on the number of available copies of the respective data sets 104, the type of failure 118 detected, the types of storage devices 106 (e.g., the RAID scheme implemented on the devices), and the interests of a user (e.g., the user may be permitted to select among various cleaning options that vary in terms of complexity, reliability, and duration of cleaning 416). In some scenarios, multiple types of cleaning 416 may be performed (e.g., a quick cleaning 416 involving a rapid identification of easily detected inconsistencies 122 and the prompt restoration of access to the data set 102, followed by a complex cleaning 416 that verifies the integrity of the storage set 102 to address inconsistencies 122 that are more difficult to correct and repair).

As a second variation of this third aspect, the recovery of the storage set 102 may be performed in particular order. For example, the storage set 102 may comprise many types of data sets 104 stored on many storage devices. In some scenarios, a naïve recovery may apply the cleaning 416 to the storage set 102 in an arbitrary order, while an ordered recovery may apply the cleaning 416 first to some portions of the storage set 102 that comprise valuable or more heavily utilized data sets 104 before applying the cleaning 416 (e.g., data in use) to other portions of the storage set 102 that comprise less valuable or infrequently requested data sets 104 (e.g., archival data). As one such example, respective regions 402 of the storage set 102 may be apportioned into one or more region sets, each having a region descriptor 404, and the recovery may involve cleaning 416 the regions 402 of a first region set represented by a first region descriptor 404 before cleaning the regions 402 of a second region set represented by a second region descriptor 404.

As a third variation of this third aspect, the recovery may comprise, before initiating a cleaning 416 based on a region descriptor 404, verifying the integrity of the region descriptor 404 (e.g., according to a verifier 202 stored with the region descriptor 404). If part of the region descriptor 404 is found to be unverifiable (e.g., inconsistent or corrupt due to a failure 118 while writing to a portion of the region descriptor 404), the recovery may involve using the verifiable portions of the region descriptor 404, and performing a full cleaning 416 of the regions 402 represented in the corrupted portion of the region descriptor 404. Alternatively, the recovery may involve locating and using another copy of the region descriptor 404 (e.g., an identical or slightly stale but verifiable copy of the region descriptor 404 stored elsewhere on the same storage device 106, or on another storage device 106 of the storage set 102). Indeed, if two or more region descriptors 404 are each found to be partially corrupt, the recovery may be fully achieved by using the valid portions of each region descriptor 404. Alternatively, if no verifiable copy of the region descriptor 404 is available, the recovery may initiate a full cleaning of the storage set 102 (e.g., a full scan and resynchronization of the entire storage set 102). In these ways, an embodiment of these techniques may be configured to recover from different types of failures 118 of the storage set 102. Those of ordinary skill in the art may devise many ways of recovering from failures 118 of the storage set 102 in accordance with the techniques presented herein.

E. Computing Environment

Figure 11:
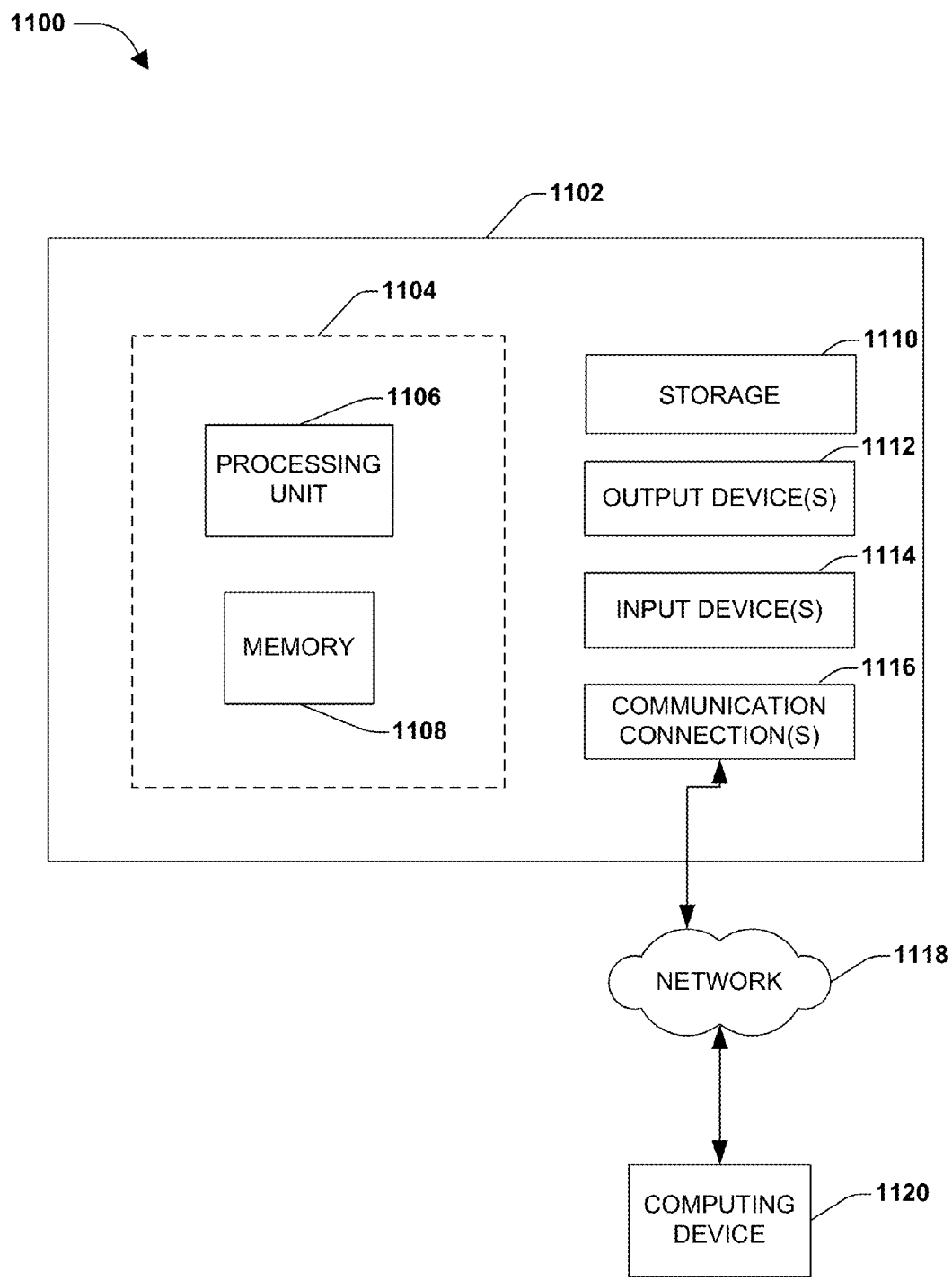
FIG. 11 illustrates an exemplary computing environment wherein one or more of the provisions set forth herein may be implemented.

FIG. 11 presents an illustration of an exemplary computing environment within a computing device 1102 wherein the techniques presented herein may be implemented. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, and distributed computing environments that include any of the above systems or devices.

FIG. 11 illustrates an example of a system 1100 comprising a computing device 1102 configured to implement one or more embodiments provided herein. In one configuration, the computing device 1102 includes at least one processor 1106 and at least one memory component 1108. Depending on the exact configuration and type of computing device, the memory component 1108 may be volatile (such as RAM, for example), non-volatile (such as ROM, flash memory, etc., for example) or an intermediate or hybrid type of memory component. This configuration is illustrated in FIG. 11 by dashed line 1104.

In some embodiments, device 1102 may include additional features and/or functionality. For example, device 1102 may include one or more additional storage components 1110, including, but not limited to, a hard disk drive, a solid-state storage device, and/or other removable or non-removable magnetic or optical media. In one embodiment, computer-readable and processor-executable instructions implementing one or more embodiments provided herein are stored in the storage component 1110. The storage component 1110 may also store other data objects, such as components of an operating system, executable binaries comprising one or more applications, programming libraries (e.g., application programming interfaces (APIs), media objects, and documentation. The computer-readable instructions may be loaded in the memory component 1108 for execution by the processor 1106.

The computing device 1102 may also include one or more communication components 1116 that allows the computing device 1102 to communicate with other devices. The one or more communication components 1116 may comprise (e.g.) a modem, a Network Interface Card (NIC), a radiofrequency transmitter/receiver, an infrared port, and a universal serial bus (USB) USB connection. Such communication components 1116 may comprise a wired connection (connecting to a network through a physical cord, cable, or wire) or a wireless connection (communicating wirelessly with a networking device, such as through visible light, infrared, or one or more radiofrequencies).

The computing device 1102 may include one or more input components 1114, such as keyboard, mouse, pen, voice input device, touch input device, infrared cameras, or video input devices, and/or one or more output components 1112, such as one or more displays, speakers, and printers. The input components 1114 and/or output components 1112 may be connected to the computing device 1102 via a wired connection, a wireless connection, or any combination thereof. In one embodiment, an input component 1114 or an output component 1112 from another computing device may be used as input components 1114 and/or output components 1112 for the computing device 1102.

The components of the computing device 1102 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of the computing device 1102 may be interconnected by a network. For example, the memory component 1108 may be comprised of multiple physical memory units located in different physical locations interconnected by a network.

Those skilled in the art will realize that storage devices utilized to store computer readable instructions may be distributed across a network. For example, a computing device 1120 accessible via a network 1118 may store computer readable instructions to implement one or more embodiments provided herein. The computing device 1102 may access the computing device 1120 and download a part or all of the computer readable instructions for execution. Alternatively, the computing device 1102 may download pieces of the computer readable instructions, as needed, or some instructions may be executed at the computing device 1102 and some at computing device 1120.

F. Usage of Terms

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of recording writes pending within a storage set provided by at least one storage device, the method comprising:

on at least one storage device, generating a region descriptor apportioning the storage set stored on the storage device into at least two regions according to a region size;

upon receiving a request to store a data set at a location in the storage set:
identifying a region within the storage set comprising the location of the data set;
marking the region as dirty in the region descriptor; and
initiating storage of the data set at the location in the storage set;

after storing the data set at the location in the storage set, marking the region as clean in the region descriptor.

2. The method of claim 1:
the region descriptor comprising a dirty region array of array entries sequentially corresponding to the regions of the storage set; and
marking a region as dirty comprising: marking the array entry of the dirty region array as dirty.

3. The method of claim 1, respective dirty regions identifying respective regions in the storage device according to a region referencing scheme selected from a region referencing scheme set comprising:
a physical region referencing scheme identifying a physical location of a region on a storage device of the storage set; and
a logical region referencing scheme identifying a logical location of a region on a logical device of the storage set.

4. The method of claim 1:
the storage set comprising at least two region sets of regions; and
respective region sets comprising at least one region descriptor representing the regions of the region set.

5. The method of claim 4:
at least one region set stored using a fault-tolerant storage technique; and
the storage set configured to refrain from generating a region descriptor for storage sets using the fault-tolerant storage technique.

6. The method of claim 1, the storage set comprising at least two region descriptors stored on different storage devices of the storage set.

7. The method of claim 6:
the storage set configured to tolerate a failure of storage devices within a storage device failure tolerance; and
the storage set configured to store the region descriptor across a number of storage devices as least satisfying the storage device failure tolerance.

8. The method of claim 1:
the storage set comprising at least two region descriptors respectively comprising an update sequence indicator; and
the method comprising: upon storing a data set at a location in the storage set:
selecting a stale region descriptor not having a latest update sequence indicator among the region descriptors;
marking the region comprising the location of the data set as updated in the stale region descriptor; and
updating the update sequence indicator to a latest update sequence indicator among the region descriptors.

9. The method of claim 1:
respective region descriptors comprising a region descriptor verifier of the region descriptor; and
the method comprising: upon marking a region in the region descriptor, updating the region descriptor verifier of the region descriptor.

10. The method of claim 1:
generating the region descriptor on a storage device comprising: allocating region descriptor space on the storage device for the region descriptor; and
the method comprising: upon filling the region descriptor space with dirty regions, expanding the region descriptor space.

11. The method of claim 1, marking a region as dirty in at least one region descriptor comprising:
determining whether the region is marked as clean in the region descriptor; and
upon determining that the region is marked as clean in the region descriptor, mark the region as dirty.

12. The method of claim 1, marking a region as clean in at least one region descriptor comprising:
upon completing storing a data set at a location within the region, identify the region as clean; and
upon receiving a request to mark cleaned regions as clean in the region descriptor, mark at least one cleaned region as clean in the region descriptor.

13. The method of claim 12, the request to mark cleaned regions as clean in the region descriptor comprising a clean marking criterion selected from a clean marking criterion set comprising:
a cleaned duration criterion; and
a region descriptor capacity criterion.

14. The method of claim 12:
the region descriptor having a dirty region capacity of dirty regions marked in the region descriptor; and
the method comprising: upon the dirty regions marked in the region descriptor reaching the dirty region capacity:
flushing the storage set;
identifying the dirty regions as cleaned; and
marking at least one cleaned region among the dirty regions of the region descriptor as clean.

15. A method of cleaning a storage set comprising at least two data sets respectively stored by at least one storage device, respective storage devices comprising a region descriptor apportioning the storage set stored on the storage device into at least two regions according to a region size, the method comprising:
for the respective storage devices of the storage set:
retrieving the region descriptor stored on the storage device; and
for the respective regions of the storage device that are marked as dirty in the region descriptor:
initiating cleaning the data sets within the region; and
upon completing cleaning the data sets within the region, marking the region as clean in the region descriptor.

16. The method of claim 15, cleaning a region selected from a cleaning set comprising:
a mirroring cleaning comprising, for respective data sets of the region corresponding with a mirror data set stored in a second region of the storage set, synchronizing the data set with the mirror data set; and
a verifier cleaning comprising, for respective data sets of the region having a verifier, verifying the verifiers of the data sets of the region.

17. The method of claim 15:
the storage set comprising:
at least two region sets of regions; and
at least two region descriptors respectively representing the regions of a region set; and
cleaning a region comprising: cleaning the regions of a first region set represented by a first region descriptor before cleaning the regions of a second region set represented by a second region descriptor.

18. The method of claim 15:
the storage set comprising at least two region descriptors respectively comprising an update sequence indicator; and
identifying the at least one dirty region in the storage set comprising:
selecting a latest region descriptor having a latest update sequence indicator among the region descriptors; and
identifying the at least one dirty region in the storage set according to the region descriptor.

19. The method of claim 15:
respective region descriptors comprising a region descriptor verifier of the region descriptor;
identifying the dirty regions comprising: verifying the region descriptor verifier of the region descriptor; and
the method comprising: upon failing to verify the region descriptor verifier of the region descriptors, initiating a full cleaning of the storage devices of the storage set.

20. A computer-readable storage medium storing instructions that, when executed on a processor of a computer, cause the computer to record writes pending within a storage set provided by at least one storage device, by:
on at least one storage device, generating a region descriptor apportioning the storage set stored on the storage device into at least two regions according to a region size;
upon receiving a request to store a data set at a location in the storage set:
identifying a region within the storage set comprising the location of the data set;
marking the region as dirty in the region descriptor; and
initiating storage of the data set at the location in the storage set;
after storing the data set at the location in the storage set, marking the region as clean in the region descriptor.

\* \* \* \* \*